(12) United States Patent
Kim et al.

(10) Patent No.: US 11,052,917 B2
(45) Date of Patent: Jul. 6, 2021

(54) VEHICLE CONTROL DEVICE PROVIDED IN VEHICLE AND METHOD FOR CONTROLLING VEHICLE

(71) Applicant: LG Electronics Inc., Seoul (KR)

(72) Inventors: Youngil Kim, Seoul (KR); Hyeonju Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 245 days.

(21) Appl. No.: 16/250,998

(22) Filed: Jan. 17, 2019

(65) Prior Publication Data

US 2019/0217868 A1    Jul. 18, 2019

(30) Foreign Application Priority Data

Jan. 17, 2018  (KR) .................. 10-2018-0006247

(51) Int. Cl.
  *B60W 50/023*  (2012.01)
  *B60W 50/029*  (2012.01)
  *G05D 1/00*  (2006.01)
  *G06F 8/65*  (2018.01)

(52) U.S. Cl.
  CPC ........ *B60W 50/023* (2013.01); *B60W 50/029* (2013.01); *G05D 1/0088* (2013.01); *G06F 8/65* (2013.01); *B60W 2050/0297* (2013.01); *G05D 2201/0213* (2013.01)

(58) Field of Classification Search
  CPC ............. B60W 50/023; B60W 50/029; B60W 2050/0297; G05D 1/0088; G05D 2201/0213; G06F 8/65
  USPC ........................................................ 701/23
  See application file for complete search history.

(56) References Cited

U.S. PATENT DOCUMENTS

2018/0015918 A1* 1/2018 Bae ..................... B60W 30/09

FOREIGN PATENT DOCUMENTS

| JP | 2016084093 | 5/2016 |
| JP | 2017132285 | 8/2017 |
| JP | 2017145822 | 8/2017 |
| JP | 2017165296 | 9/2017 |
| KR | 1020150127351 | 11/2015 |

* cited by examiner

*Primary Examiner* — Gertrude Arthur Jeanglaude
(74) *Attorney, Agent, or Firm* — Fish & Richardson P.C.

(57) ABSTRACT

A vehicle control device includes at least one processor configured to perform operations including: performing a function related to autonomous driving based on a sensor signal from a sensing unit of a vehicle; autonomously driving the vehicle based on performance of the function related to autonomous driving; in a state in which the vehicle is autonomously driven, receiving an update request related to a first sensor of the sensing unit from a communication unit of the vehicle; determining presence of a second sensor configured to provide the sensor signal for performance of the function related to autonomous driving; and in response to reception of the update request, updating information related to the first sensor based on presence of the second sensor.

20 Claims, 13 Drawing Sheets

FIG. 1
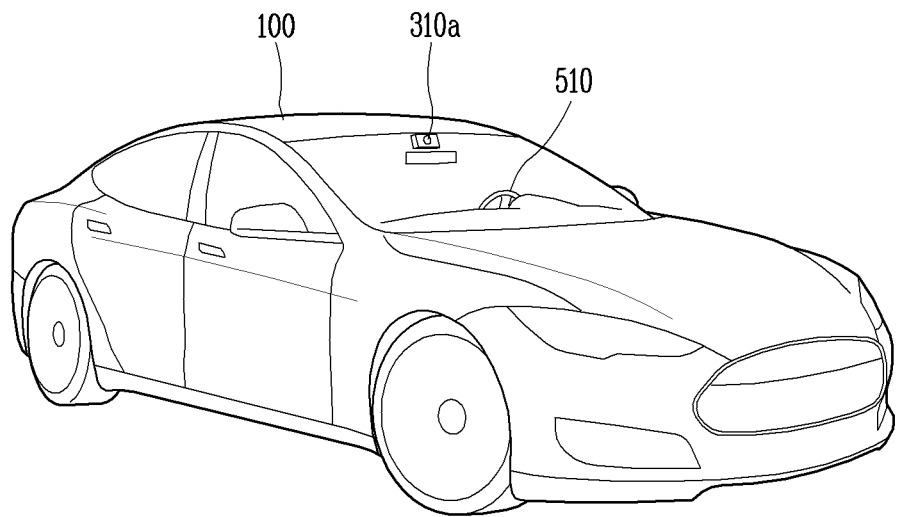
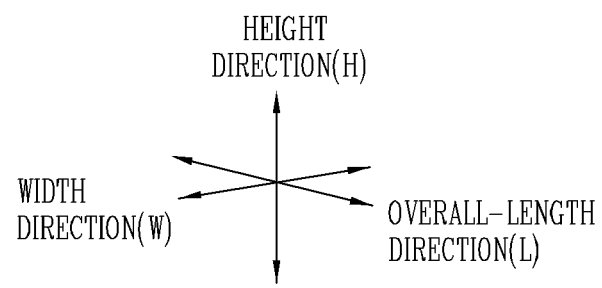

FIG. 12
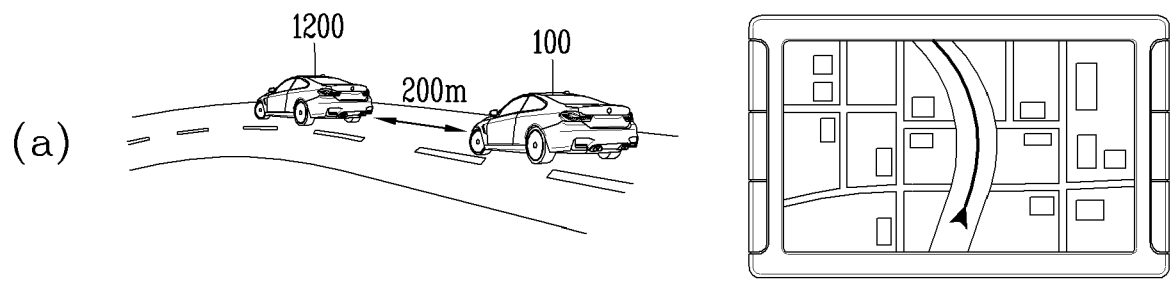
(a)
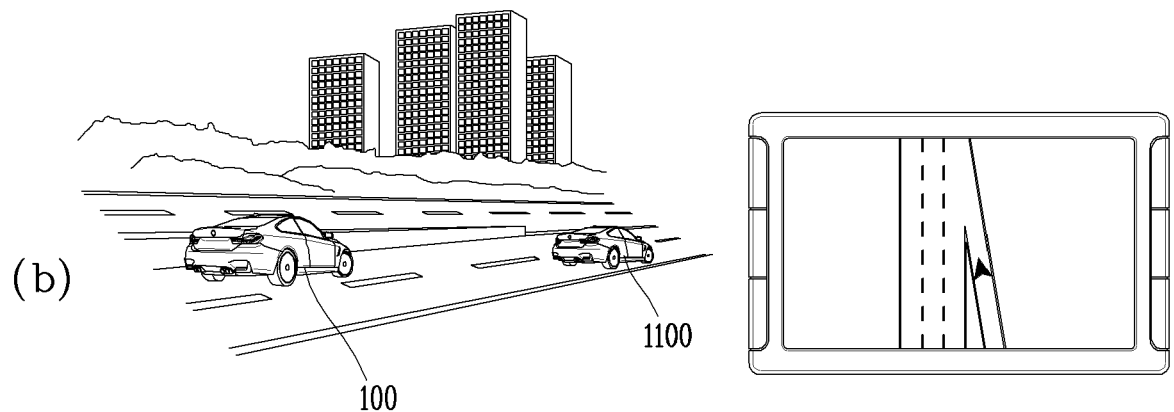
(b)
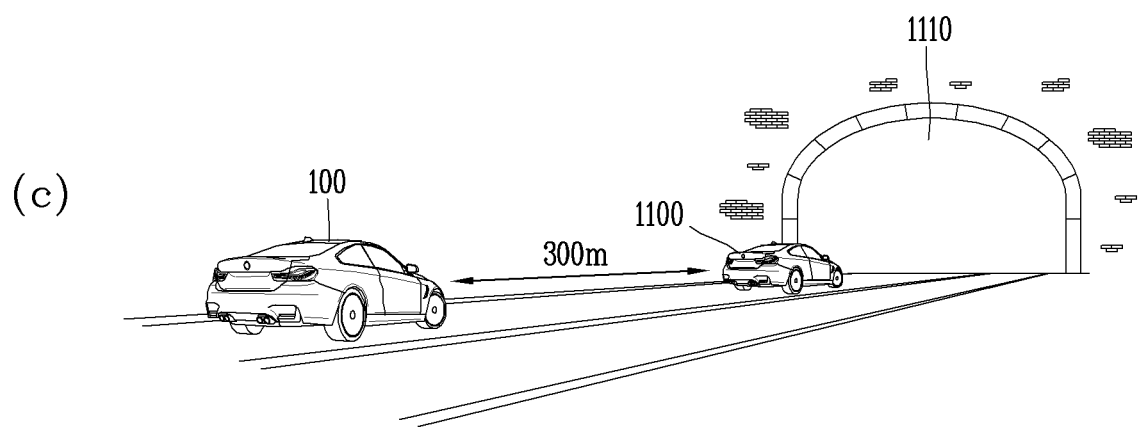
(c)

FIG. 14
(a) 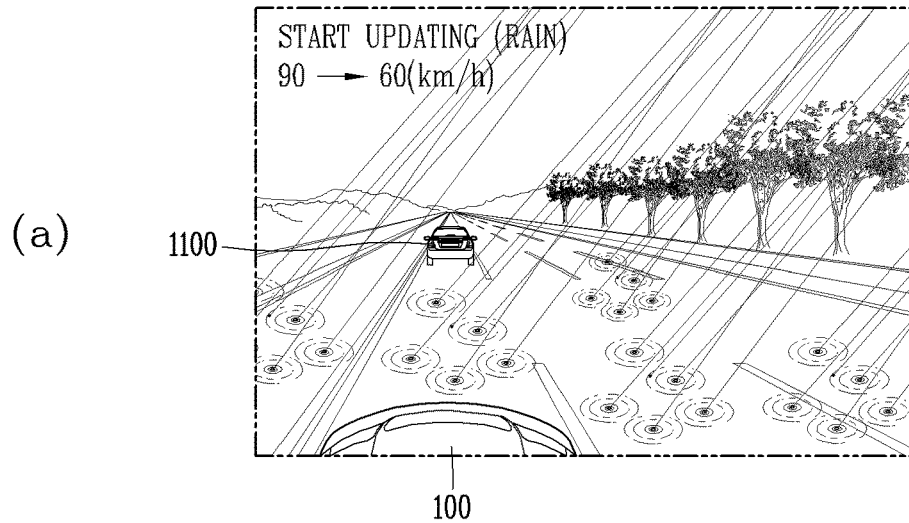
(b) 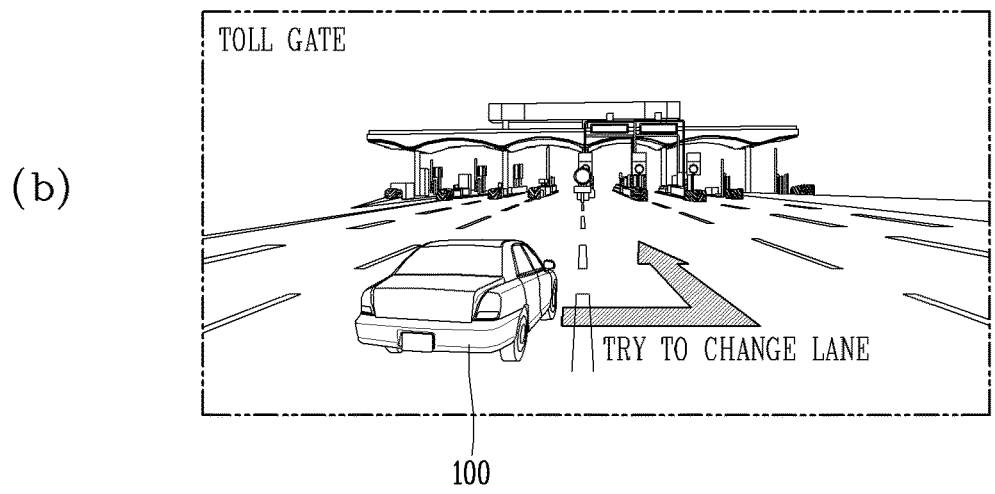
(c) 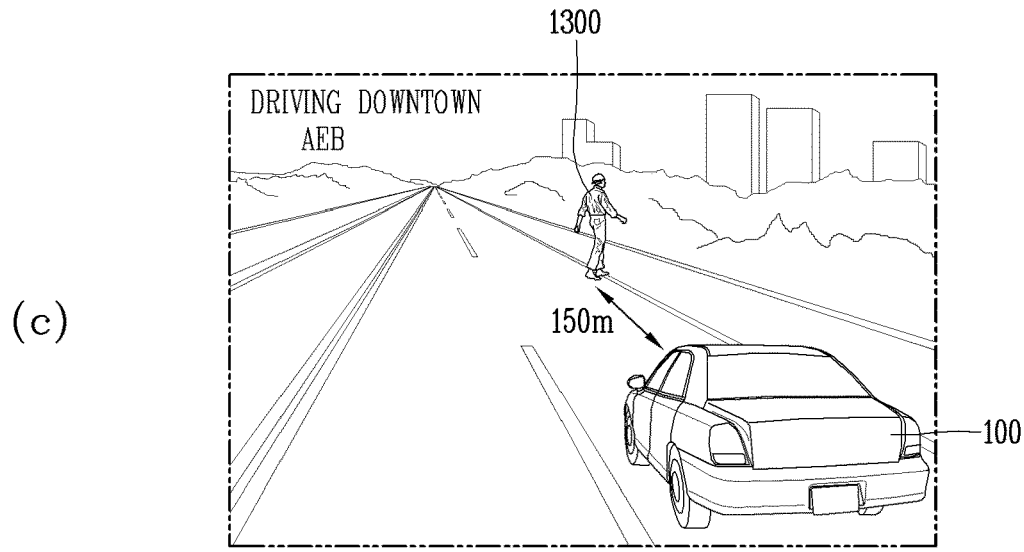

VEHICLE CONTROL DEVICE PROVIDED IN VEHICLE AND METHOD FOR CONTROLLING VEHICLE

CROSS-REFERENCE TO RELATED APPLICATION

Pursuant to 35 U.S.C. § 119(a), this application claims the benefit of an earlier filing date of and the right of priority to Korean Application No. 10-2018-0006247, filed on Jan. 17, 2018, the contents of which are incorporated by reference herein in its entirety.

FIELD

The present disclosure relates to a vehicle control device provided in a vehicle and a method for controlling a vehicle.

BACKGROUND

A vehicle is an apparatus that can transport a user in a desired direction. One example of a vehicle is an automobile.

In some examples, a vehicle may include various sensors and electronic devices for convenience of the user who use the vehicle. For example, an advanced driver assistance system (ADAS) and autonomous vehicles may improve user convenience.

A vehicle may include various types of lamps. For example, a vehicle may include a variety of vehicle lamps having a lighting function for allowing an object located near the vehicle to be easily recognized at night, and a signal function for notifying other vehicles or other road users about a driving state of the vehicle.

For example, the vehicle may include devices that directly emit light using lamps such as a headlamp, which irradiates light to a front side of the vehicle to secure a driver's field of view, a brake light which is turned on when a brake is stepped on, or a turn signal which indicates a turn to right or left.

Recently, as the ADAS has been actively developed, there is an interest in a technology that maximizes user convenience and safety in vehicle operation.

In some cases, the ADAS includes a variety of functions that facilitate vehicle operation, where various sensors are used to implement the functions of the ADAS.

In some cases, software for controlling the sensors may be updated in order to use various sensors properly. If there is a defect in the software that controls the sensors, the ADAS function may not be used properly, and if security of the software that controls the sensors is weak, there is a risk of hacking.

If a defect of software for controlling the sensors occurs during autonomous driving or if software hacking occurs during autonomous driving, safety of the user present in a vehicle may not be guaranteed.

It is of interest to develop a method for enabling updating of software for controlling a sensor while a vehicle is autonomously driving.

SUMMARY

One aspect of the detailed description is to provide a vehicle control device capable of performing updating related to a sensor in an optimized manner, and a method for controlling a vehicle.

Another aspect of the detailed description is to provide a vehicle control device capable of maintaining a function related to autonomous driving which is being performed using another sensor while performing updating related to a sensor, and a method for controlling a vehicle.

Another aspect of the detailed description is to provide a vehicle control device capable of controlling a vehicle in an optimized manner when updating related to a sensor is performed, and a method for controlling a vehicle.

Technical tasks obtainable from the present disclosure are not limited to the above-mentioned technical task and any other unmentioned technical tasks may be clearly understood from the following description by those having ordinary skill in the art.

According to one aspect of the subject matter described in this application, disclosed is a vehicle control device for a vehicle that includes a communication unit and a sensing unit including at least one sensor. The vehicle control device includes: at least one processor; and at least one computer-readable memory that is operably connectable to the at least one processor and that has stored thereon instructions which, when executed, cause the at least one processor to perform operations. The operations include: performing a function related to autonomous driving based on a sensor signal from the sensing unit; autonomously driving the vehicle based on performance of the function related to autonomous driving; in a state in which the vehicle is autonomously driven, receiving an update request related to a first sensor of the sensing unit from the communication unit of the vehicle; determining presence of a second sensor configured to provide the sensor signal for performance of the function related to autonomous driving; and in response to reception of the update request, updating information related to the first sensor based on presence of the second sensor. The vehicle control device is configured to connect to the communication unit of the vehicle and to the sensing unit of the vehicle.

Implementations according to this aspect may include one or more of the following features. For example, the operations may further include: based on a determination that the second sensor is present at the vehicle, updating the information related to the first sensor; and maintaining performance of the function related to autonomous driving based on a second sensor signal from the second sensor. In some examples, the operations further include: based on completion of updating the information related to the first sensor, performing the function related to autonomous driving based on a first sensor signal from the first sensor.

In some implementations, updating the information includes updating the information related to the first sensor in a state in which the vehicle is autonomously driven. Ins some examples, the operations further include: based on a determination that the second sensor is not present at the vehicle, controlling the vehicle in a predetermined manner. In some examples, the operations further include: terminating a first function related to autonomous driving based on a first sensor signal from the first sensor; performing a second function related to autonomous driving; autonomously driving the vehicle based on performance of the second function related to autonomous driving; and updating the information related to the first sensor after termination of the first function.

In some implementations, performing the second function includes performing the second function related to autonomous driving based on a third sensor signal from a third sensor, the third sensor being different from the first sensor. In some examples, the operations further include: based on completion of updating the information related to the first sensor, terminating the second function; and based on termination of the second function, autonomously driving the vehicle based on performance of the first function. In some examples, the operations further include, based on execution of the second function, autonomously driving the vehicle by changing at least one of an inter-vehicle distance, a vehicle speed of the vehicle, or a lane in which the vehicle is currently driving.

In some implementations, the operations further include: determining an available space based on the sensor signal from the sensing unit; stopping the vehicle at the available space; and after stopping the vehicle at the available space, updating the information related to the first sensor. In some examples, the operations further include: determining a shape of a road in which the vehicle is currently driving based on the sensor signal from the sensing unit; determining whether the vehicle enters one or more sections of a road having a shape that satisfies a predetermined condition; and based on a determination that the vehicle enters at least a section of the road having the shape that satisfies the predetermined condition, updating the information related to the first sensor.

In some implementations, the operations further include: receiving weather information from the sensing unit; and based on the weather information, determining whether to update the information related to the first sensor in a state in which the vehicle is autonomously driven. In some examples, the operations further include: while updating the information related to the first sensor, detecting, through the sensing unit, that an object is located at a predetermined distance from the vehicle; and based on detection of the object located at the predetermined distance, driving the vehicle to avoid the object based on a signal from a sensor that is different from the first sensor.

In some examples, the operations further include: determining whether the sensor different from the first sensor is available to provide the signal for driving the vehicle to avoid the object; and based on a determination that the sensor different from the first sensor is not available, stopping the vehicle at a location outside of the predetermined distance until completion of updating the information related to the first sensor. In some implementations, the operations further include: turning on a lamp of the vehicle in a predetermined manner while updating the information related to the first sensor. In some examples, the operations further include: autonomously driving the vehicle based on a preceding vehicle present ahead of the vehicle while updating the information related to the first sensor.

According to another aspect, a vehicle includes one or more wheels, a power source configured to drive the one or more wheels, a vehicle control device configured to control operation of the vehicle, a communication unit configured to communicate with the vehicle control device, and a sensing unit configured to provide a sensor signal to the vehicle control device, where the sensing unit includes at least one sensor. The vehicle control device includes at least one processor; and at least one computer-readable memory that is operably connectable to the at least one processor and that has stored thereon instructions which, when executed, cause the at least one processor to perform operations including: performing a function related to autonomous driving based on the sensor signal from the sensing unit; autonomously driving the vehicle based on performance of the function related to autonomous driving; in a state in which the vehicle is autonomously driven, receiving an update request related to a first sensor of the sensing unit from the communication unit; determining presence of a second sensor that is configured to provide the sensor signal for performance of the function related to autonomous driving; and in response to reception of the update request, updating information related to the first sensor based on presence of the second sensor.

Implementations according to this aspect may include one or more of the features described above with respect to the vehicle control device.

According to another aspect, a method for controlling a vehicle includes: performing a function related to autonomous driving based on a sensor signal from a sensing unit of the vehicle; autonomously driving the vehicle based on performance of the function related to autonomous driving; in a state in which the vehicle is autonomously driven, receiving an update request related to a first sensor of the sensing unit; determining presence of a second sensor that is configured to provide the sensor signal for performance of the function related to autonomous driving; and in response to reception of the update request, updating information related to the first sensor based on presence of the second sensor in a state in which the vehicle is autonomously driven.

Implementations according to this aspect may include one or more of the following features and the features described above with respect to the vehicle control device. For example, updating the information may include: based on a determination that the second sensor is present at the vehicle, updating the information related to the first sensor; and maintaining performance of the function related to autonomous driving based on a second sensor signal from the second sensor. In some examples, updating the information further includes: based on completion of updating the information related to the first sensor, performing the function related to autonomous driving based on a first sensor signal from the first sensor.

In some implementations, a vehicle includes the vehicle control device described in this disclosure.

The details of other implementations are included in the detailed description and the drawings.

According to implementations of the present disclosure, one or more of the following effects are obtained.

First, the present disclosure may provide the new vehicle control method (i.e., method for controlling a vehicle) capable of performing updating related to a sensor while autonomously driving the vehicle.

Second, the present disclosure may provide the vehicle control device and the vehicle control method capable of safely performing updating related to a sensor while driving the vehicle.

Third, the present disclosure may provide the new vehicle control method capable of maintaining autonomous driving although updating related to a sensor is started.

The effects of the present disclosure are not limited to the effects mentioned above, and other effects not mentioned may be clearly understood by those skilled in the art from the description of the claims.

Further scope of applicability of the present application will become more apparent from the detailed description given hereinafter. However, it should be understood that the detailed description and specific examples, while indicating preferred implementations of the disclosure, are given by way of illustration only, since various changes and modifications within the scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary implementations and together with the description serve to explain the principles of the disclosure.

FIG. 1 is a view illustrating an example appearance of an example vehicle.

FIGS. 12, 13, and 14 are conceptual views for explaining examples of the present disclosure.

DETAILED DESCRIPTION

Description will now be given in detail according to exemplary implementations disclosed herein, with reference to the accompanying drawings. For the sake of brief description with reference to the drawings, the same or equivalent components may be provided with the same or similar reference numbers, and description thereof will not be repeated.

A vehicle may include, but not be limited to, cars, motorcycles, and the like. Hereinafter, the vehicle will be described based on a car.

The vehicle according to the implementation of the present disclosure may include one or more of an internal combustion engine car having an engine as a power source, a hybrid vehicle having an engine and an electric motor as power sources, an electric vehicle having an electric motor as a power source, or the like.

In the following description, a left side of a vehicle refers to a left side in a driving direction of the vehicle, and a right side of the vehicle refers to a right side in the driving direction.

FIG. 1 is a view illustrating an example appearance of an example vehicle.

Figure 2:
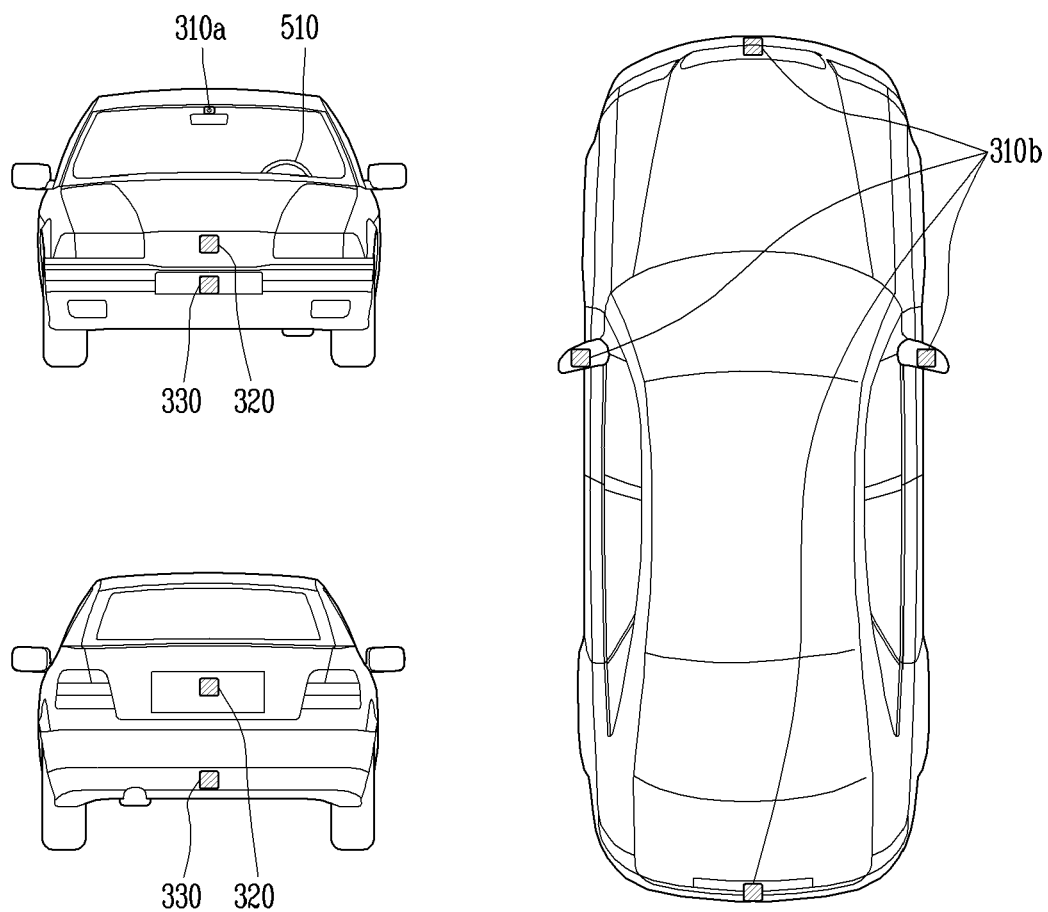
FIG. 2 is a view illustrating an example vehicle viewed at various angles.

FIG. 2 is a view illustrating an example appearance of an example vehicle at various angles.

Figure 3:
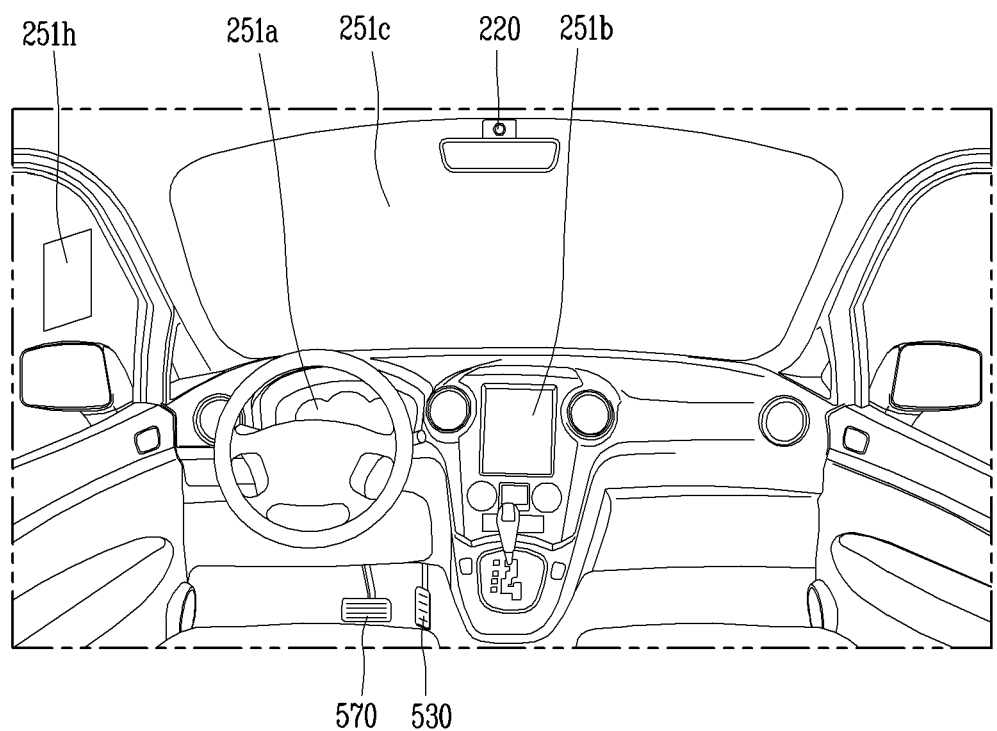
FIGS. 3 and 4 are views illustrating an example inside of an example vehicle.
Figure 4:
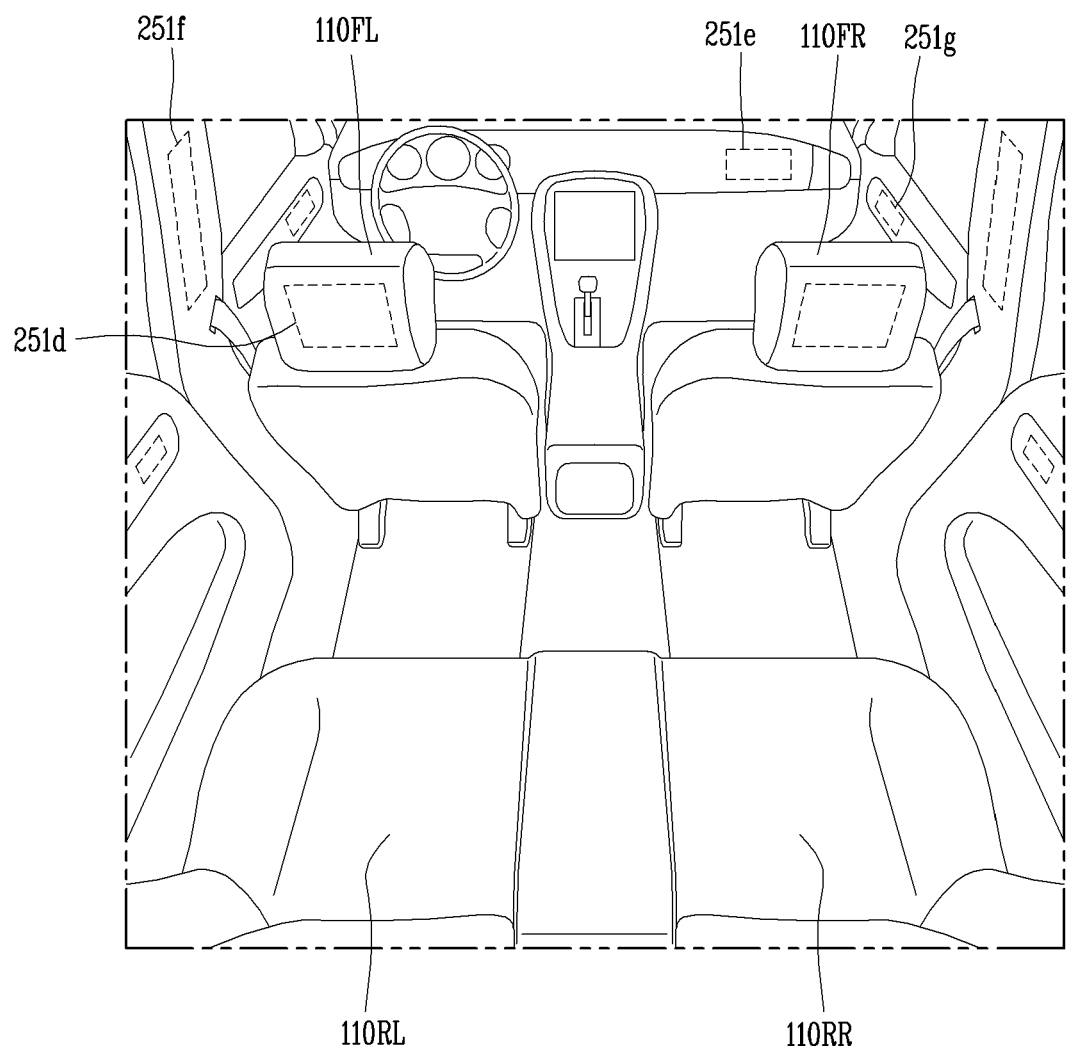

FIGS. 3 and 4 are views illustrating an example inside of an example vehicle.

Figure 5:
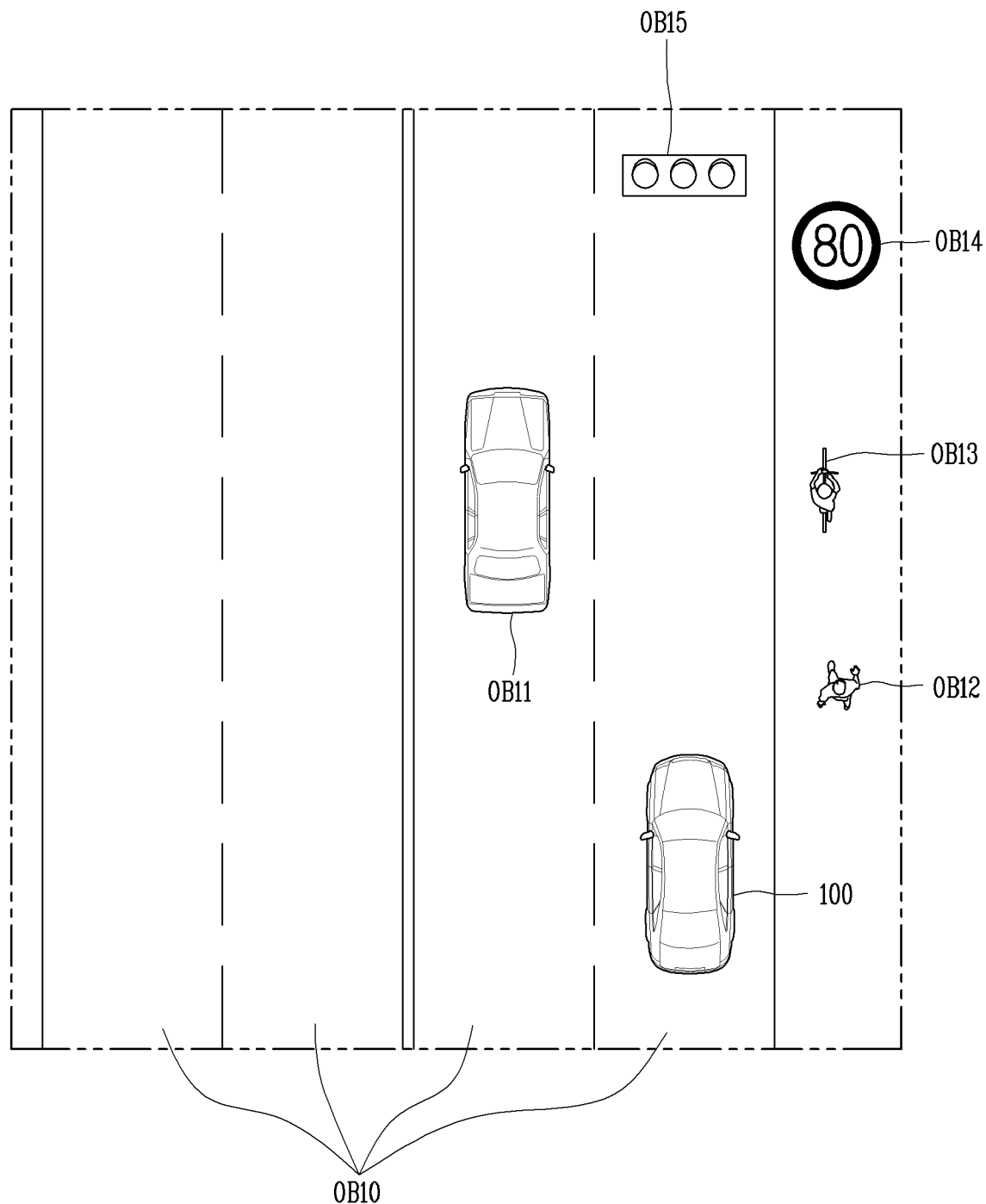
FIGS. 5 and 6 are views illustrating example objects around a vehicle.
Figure 6:
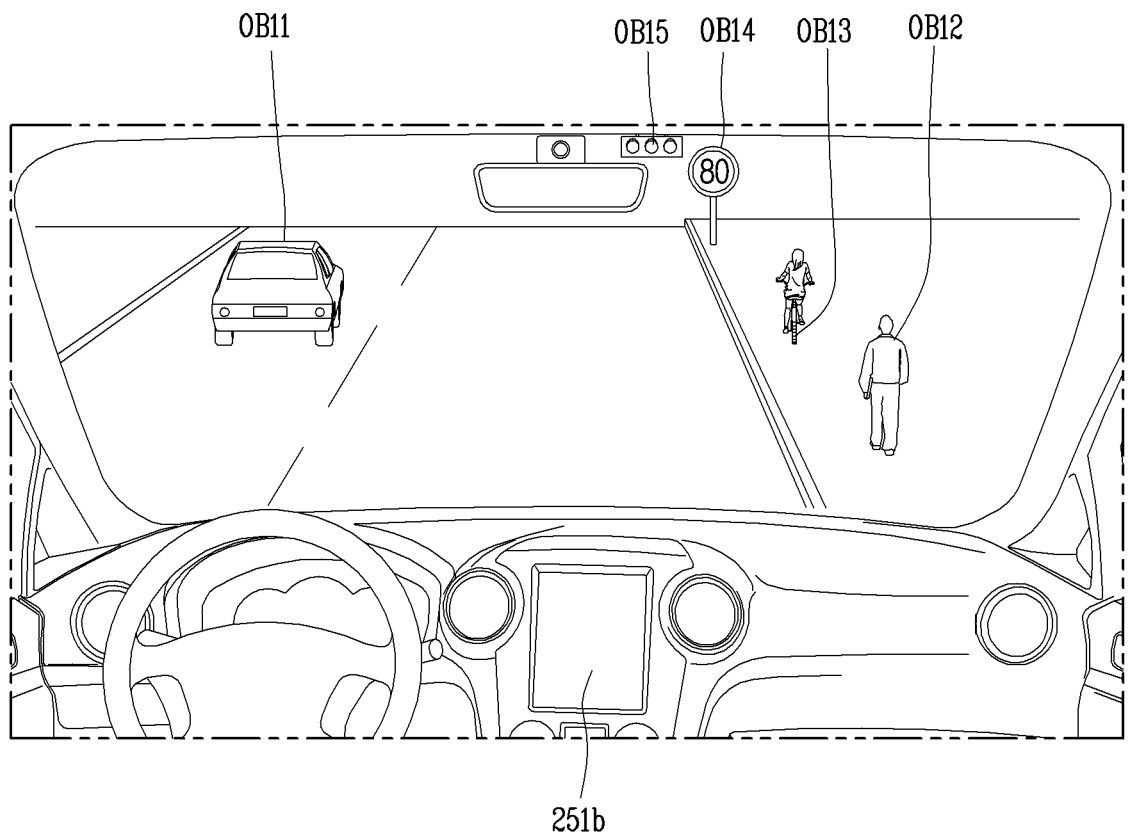

FIGS. 5 and 6 are reference views illustrating example objects around a vehicle.

Figure 7:
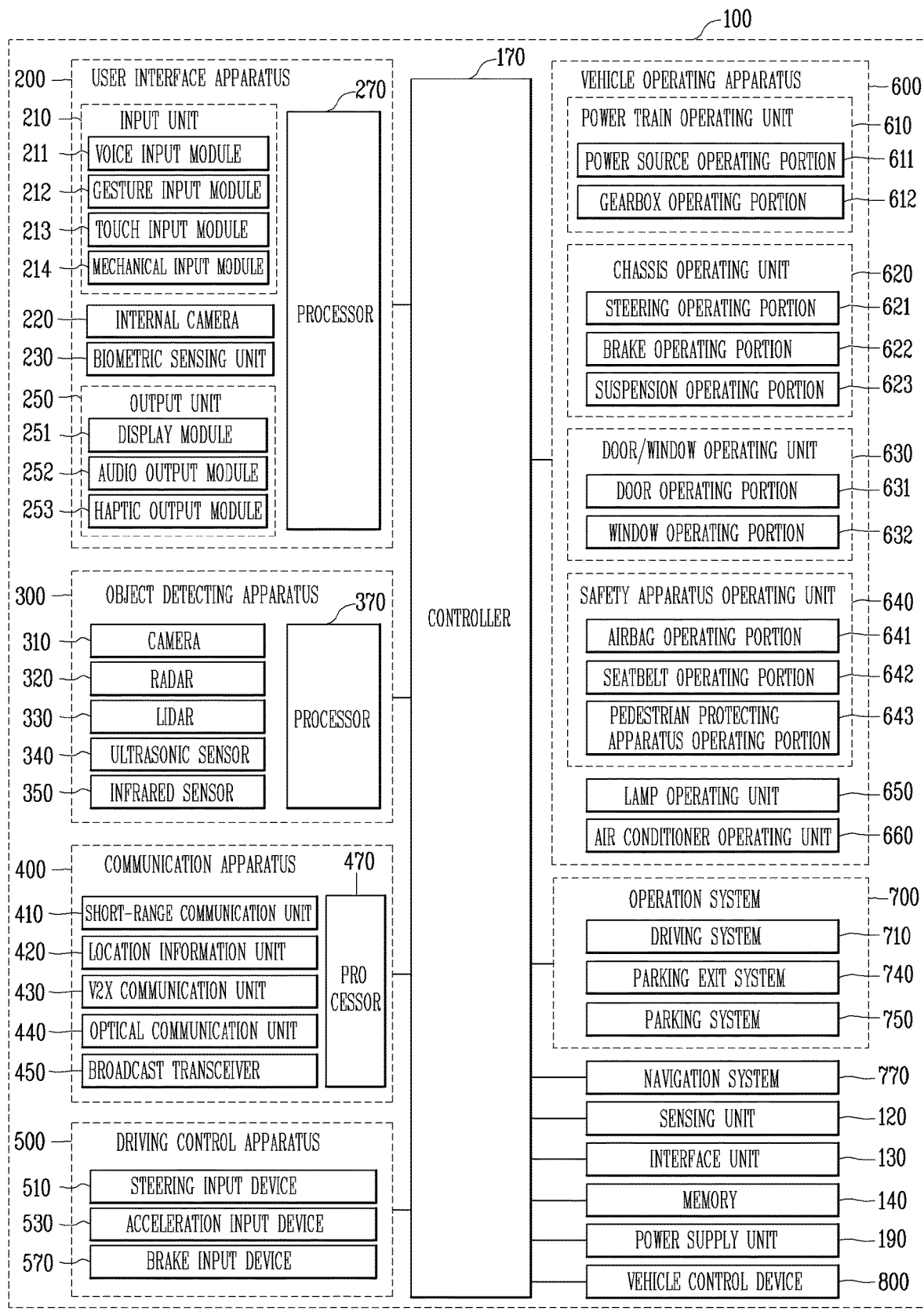
FIG. 7 is a block diagram of example components of a vehicle.

FIG. 7 is a block diagram illustrating example components of an example vehicle.

As illustrated in FIGS. 1 to 7, a vehicle 100 may include wheels turning by a driving force, and a steering input device 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to implementations, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to implementations, the user interface apparatus 200 may include more components in addition to components to be explained in this specification or may not include some of those components to be explained in this specification.

The input unit 210 may allow the user to input information. Data collected in the input unit 210 may be analyzed by the processor 270 and processed as a user's control command.

The input unit 210 may be disposed within the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The voice input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor or an image sensor for detecting the user's gesture input.

According to implementations, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel, or a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252, or a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display, or an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, or a transparent LED display. The transparent display may have adjustable transparency.

In some implementations, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

In some implementations, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some implementations, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The vehicle OB11 may be a vehicle which is moving around the vehicle 100. The vehicle OB11 may be a vehicle located within a predetermined distance from the vehicle 100. For example, the vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In some implementations, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

In some implementations, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. In other examples, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

In some implementations, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, a radio frequency (RF) circuit, or a RF device for implementing various communication protocols.

The communication apparatus 400 may include a short-range communication unit 410, a location information unit 420, a V2X communication unit 430, an optical communication unit 440, a broadcast transceiver 450 and a processor 470.

In some implementations, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

In some implementations, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some implementations, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some implementations, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described, or may not include some of the components described.

In some implementations, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In some implementations, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, and 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to implementations, the operation system 700 may further include other components in addition to components to be described, or may not include some of the components to be described.

In some implementations, the operation system 700 may include a processor. Each unit of the operation system 700 may individually include a processor.

In some implementations, the operation system may be a sub concept of the controller 170 when it is implemented in a software configuration.

In some implementations, the operation system 700 may be a concept including at least one of the user interface apparatus 200, the object detecting apparatus 300, the communication apparatus 400, the vehicle operating apparatus 600, or the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100. The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information, or current location information of the vehicle.

The navigation system 770 may include a memory and a processor. The memory may store the navigation information. The processor may control an operation of the navigation system 770.

According to implementations, the navigation system 770 may update pre-stored information by receiving information from an external device through the communication apparatus 400.

According to implementations, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power for operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, or electric units performing other functions.

In some implementations, the vehicle 100 related to the present disclosure may include a vehicle control device 800.

The vehicle control device 800 may control at least one of the components described above with reference to FIG. 7. In this point of view, the vehicle control device 800 may be the controller 170.

However, without being limited thereto, the vehicle control device 800 may be a separate component independent from the controller 170. When the vehicle control device 800 is implemented as a component independent from the controller 170, the vehicle control device 800 may be provided in a portion of the vehicle 100.

In some implementations, the vehicle control device 800 may include any type of device capable of controlling a vehicle. For example, the vehicle control device 800 may be a mobile terminal. In case where the vehicle control device 800 is a mobile terminal, the mobile terminal and the vehicle 100 may be communicatively connected through wired/wireless communication. Also, the mobile terminal may control the vehicle 100 in various manners in a communicatively connected state.

In case where the vehicle control device 800 is a mobile terminal, the processor 870 described in this disclosure may be a controller of the mobile terminal.

Hereinafter, for the purposes of description, it is assumed that the vehicle control device 800 is a separate component independent from the controller 170. Functions (operations) and control method described with respect to the vehicle control device 800 may be performed by the controller 170 of a vehicle. That is, all contents described in relation to the vehicle control device 800 may also be inferred and applied to the controller 170 in the same or similar manner.

Also, the vehicle control device 800 described in this disclosure may include the components described above with reference to FIG. 7 and some of various components provided in the vehicle. In this disclosure, for the purposes of description, the components described above with reference to FIG. 7 and some of various components provided in the vehicle will be given separate names and reference numerals and described accordingly.

Hereinafter, components included in the vehicle control device 800 according to an implementation of the present disclosure will be described in detail with reference to the accompanying drawings.

Figure 8:
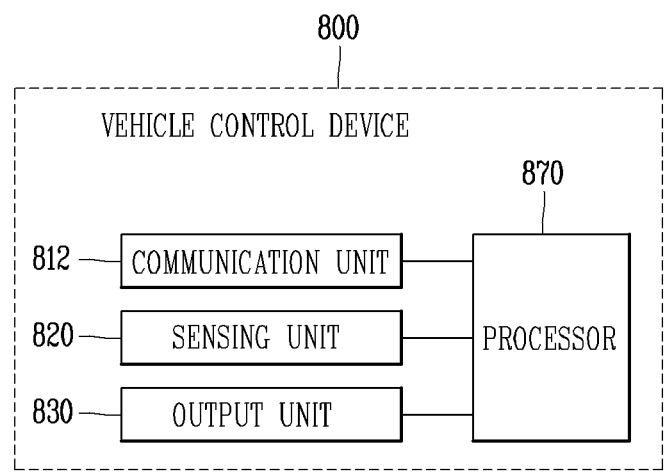
FIG. 8 is a conceptual view for explaining an example vehicle control device.

FIG. 8 is a conceptual view for explaining an example vehicle control device.

The vehicle control device 800 related to the present disclosure may include a communication unit 810, a sensing unit 820, an output unit 830, a processor 870, and the like.

The communication unit 810 may be the communication apparatus 400 described above. The communication unit 810 may be wirelessly connected to a communicable device present within or outside a vehicle to perform wireless communication therewith.

For example, the vehicle control device 800 (or the vehicle 100) and the mobile terminal may be connected for wireless communication through the communication unit 810. The vehicle control device 800 and the mobile terminal may be wirelessly connected for mutual wireless communication according to a user request, or in case where the vehicle control device 800 and the mobile terminal have once been connected for wireless communication, when the mobile terminal enters the inside of the vehicle, the mobile terminal may be wirelessly connected to the vehicle control device 800 for mutual wireless communication.

Also, the vehicle control device 800 and the mobile terminal may be wirelessly connected to each other to perform mutual wireless communication when the mobile terminal and the vehicle 100 are separated by a predetermined distance or greater or within the predetermined distance.

The communication unit 810 may be provided within the vehicle (or within the vehicle control device) or may be provided as a separate module to communicate with (or to be electrically coupled to) a component of the vehicle.

The vehicle control device 800 may control the mobile terminal through the communication unit 810.

In detail, the vehicle control device 1800 may transmit a control signal for controlling the mobile terminal to the mobile terminal through the communication unit 810. When the control signal is received, the mobile terminal may perform a function/operation/control corresponding to the control signal.

Conversely, in the present disclosure, it may be possible for the mobile terminal to control the vehicle control device 800 (or the vehicle 100). In detail, the mobile terminal may transmit a control signal for controlling the vehicle to the vehicle control device 800. In response, the vehicle control device 800 may perform a function/operation/control corresponding to the control signal transmitted from the mobile terminal.

The communication unit 810 may communicate with an external device existing outside the vehicle (e.g., an external server, a cloud server (or a cloud), the Internet, etc.). Further, the communication unit 810 may perform communication with another vehicle.

The communication unit 810 may receive information related to a destination from the external device or transmit information related to the destination to the external device. Here, the information related to the destination may include information such as an image of the destination, a location of the destination, a type of the destination, information related to a building when the destination is included in the building (e.g., structure of the corresponding building, information regarding stores on each floor), information related to a parking lot of the destination, and the like.

The reception of such information may be performed under the control of the processor 870 or an external device, for example.

Further, the communication unit 810 may receive location information of the vehicle 100. The communication unit 810 may determine a current location of the vehicle through the location information unit 420 or the V2X communication unit 430.

Specifically, the communication unit 810 receives the current location information of the vehicle using the GPS module included in the location information unit, or receives the current location information from the other vehicle or an external device (e.g., an infrastructure) via the V2X communication unit 430.

In addition, the communication unit 810 may receive information (or data, files, etc.) for updating related to a sensor from an external device. That is, the communication unit 810 may receive a request for performing updating related to the sensor from the external device, and when the request is accepted, the communication unit 810 may receive information for updating related to the sensor.

The communication unit 810 may be provided in the vehicle (or in the vehicle control device) or outside the vehicle, or may be formed in a separate module form to communicate with a component of the vehicle (or may be electrically coupled to the component of the vehicle.

The vehicle control device 800 related to the present disclosure may include a sensing unit 820. The sensing unit 820 may be the object detecting apparatus 300 described with reference to FIG. 7 or the sensing unit 120 provided in the vehicle 100.

The sensing unit 820 may include at least one sensor. For example, the sensing unit 820 may include a position sensor (e.g., a yaw sensor, a roll sensor, a pitch sensor), a collision sensor, a wheel sensor, a speed sensor, a tilt sensor, a weight sensor, a heading sensor, a yaw sensor, a gyro sensor, a position module, a vehicle forward/backward sensor, a battery sensor, a fuel sensor, a tire sensor, a steering sensor based on handle rotation, a vehicle interior temperature sensor, a vehicle interior humidity sensor, an ultrasonic sensor, an illumination sensor, an accelerator pedal position sensor, a brake pedal position sensor, and the like.

The sensing unit 820 may obtain a sensing signal regarding vehicle posture information, vehicle collision information, vehicle direction information, vehicle position information (GPS information), vehicle angle information, vehicle speed information, vehicle acceleration information, vehicle tilt information, vehicle forward/backward information, battery information, fuel information, tire information, vehicle lamp information, vehicle interior temperature information, vehicle interior humidity information, steering wheel rotation angle, vehicle outside illumination, pressure applied to acceleration pedal, pressure applied to a brake pedal, and the like.

In addition, the sensing unit 820 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, a crank angle sensor (CAS), and the like.

Also, the sensing unit 820 may include a proximity sensor, an illumination sensor, a touch sensor, an acceleration sensor, a magnetic sensor, a gravity sensor (G-sensor), a gyroscope sensor, a motion sensor, an RGB sensor, an infrared sensor, a finger scan sensor, an ultrasonic sensor, an optical sensor (e.g., camera (for reference)), a microphone, a battery gauge, an environmental sensor (e.g., such as a barometer, a hygrometer, a thermometer, a radiation sensor, a thermal sensor, a gas sensor), a chemical sensor (e.g., an electronic nose, a healthcare sensor, a biometric sensor, etc.).

The sensing unit 820 may include a camera. The camera may include, for example, an internal camera configured to photograph the interior of the vehicle and an external camera configured to photograph the exterior of the vehicle.

The sensing unit 820 may sense the sight line direction of the driver using the internal camera.

The sensing unit 820 may sense a direction of a sight line of the driver using the internal camera.

Also, the sensing unit 820 may photograph the outside of the vehicle using the external camera.

For example, the sensing unit 820 may be implemented by combining at least two of the camera 310, the radar 320, the LiDAR 330, the ultrasonic sensor 340, the infrared sensor 350, and the sensing unit 120 included in the object detecting apparatus 300.

The sensing unit 820 may sense information related to the vehicle 100.

The information related to the vehicle may be at least one of vehicle information (or a driving state of the vehicle) or surrounding information of the vehicle.

For example, the vehicle information may include a driving speed of a vehicle, a weight of the vehicle, the number of occupants of the vehicle, braking power of the vehicle, maximum braking power of the vehicle, a driving mode of the vehicle (whether it is an autonomous driving mode or a manual driving mode), a parking mode of the vehicle (autonomous parking mode, automatic parking mode, or a manual parking mode), whether the user is present in the vehicle, and information related to the user (e.g., whether the user is an authenticated user or not), and the like.

The surrounding information of the vehicle may include, for example, a state (frictional force) of a road surface on which the vehicle is driving, weather, a distance to a preceding vehicle (or subsequent vehicle), a relative speed of a preceding vehicle (or a subsequent vehicle), a bending rate of a curve when a lane in which the vehicle is driving is a curve, information related to an object present within a reference region (predetermined region) with respect to the vehicle, whether an object enters/leaves the predetermined region, whether a user is present in the vicinity of the vehicle, information related to the user (e.g., whether the user is an authenticated user or not), and the like.

Also, the surrounding information (or surrounding environmental information) of the vehicle may include external information of the vehicle (e.g., peripheral brightness, temperature, location of the sun, information of a peripheral subject (person, another vehicle, a sign, etc.), a type of a road surface on which the vehicle is driving, a geographic feature, line information, or lane information), and information for autonomous driving/autonomous parking/automatic parking/manual parking mode.

Also, the surrounding information of the vehicle may further include a distance between an object present in the vicinity of the vehicle 100 and the vehicle 100, a type of the object, a parking space in which the vehicle may park, an object (e.g., a parking line, a string, another vehicle, a wall, etc.) for identifying the parking space, and the like.

Further, the information related to the vehicle includes whether the mobile terminal is placed in a cradle provided in the vehicle, whether the mobile terminal is introduced to (is present in) the vehicle, or whether the mobile terminal has entered a predetermined distance from the vehicle (whether the mobile terminal is present within the predetermined distance from the vehicle), whether the mobile terminal and the vehicle control device are communicatively connected, and the like.

The information related to the vehicle sensed through the sensing unit 820 may be used in an autonomous driving mode for autonomous driving of the vehicle. Specifically, the processor 870 may cause the vehicle to autonomously run using the information related to the vehicle sensed through the sensing unit 820.

In addition, the vehicle control device 800 related to the present disclosure may include an output unit 830. The output unit 830 may be the output unit 250 described above with reference to FIG. 7.

The output unit 830 may include at least one of the display module 251 or the audio output module 252.

The output unit 830 may include an output unit of the vehicle and an output unit of the mobile terminal. That is, the output unit 830 may be provided in the vehicle or in a mobile terminal communicatively connected through the communication unit.

For example, the output unit provided in the vehicle may include the display module 251, the audio output module 252, the haptic output module 253, and the like. The display module 251 and the audio output module 252 may be provided inside or outside the vehicle.

The output unit 830 may include an output unit (e.g., a touch screen, an audio output unit, etc.) of the mobile terminal communicatively connected through the communication unit 810.

For example, when information is received from the external server, the processor 870 may output the information on the output unit of the mobile terminal through the communication unit 810.

The mobile terminal may be a mobile terminal present inside the vehicle or a mobile terminal present outside the vehicle.

In addition, the mobile terminal may be a mobile terminal owned by a driver (or a vehicle owner), and may be a mobile terminal of the same owner as the owner of the vehicle 100.

In addition, the mobile terminal may be a mobile terminal which has been approved (or has history of being connected) to be able to perform communication with the vehicle 100 (or the vehicle control device 800). In this case, the owner of the mobile terminal may be a person other than the owner of the vehicle 100.

The display module 251 may include an output unit (e.g., a touch screen) of a mobile terminal which may be able to communicate with the communication apparatus 400.

In addition, the display module 251 may include a transparent display. The transparent display may be attached to a windshield or window. That is, the display module 251 of the present disclosure may include a windshield and a window. In this disclosure, outputting by the processor 870 any information (or graphic object) on the display module 251 may include outputting any information (or graphic object) on the window.

The display module 251 may be disposed on one area of a steering wheel, one area 251a, 251b, or 251e of an instrument panel, one area 251d of a seat, one area 251f of each pillar, one area 251g of a door, one area of a center console, one area of a headlining, and one area of a sun visor, or may be implemented in one area 251c of a wind shield, one area 251h of a window, or the like.

For example, the display module 251 may include a cluster, a center information display (CID), a navigation device, and a head-up display (HUD).

For example, the display module 251 may include a cluster, a center fascia display (CID), a navigation device, and a head-up display (HUD).

The display module 251 may form an inter-layer structure with the touch sensor or may be integrally formed to realize a touch screen. The touch screen functions as an input unit 210 that provides an input interface between the vehicle 100 (or the vehicle control device 800) and the user and also provides an output interface between the vehicle 100 (or the vehicle control device 800) and the user.

The processor 870 may output various information related to the vehicle to the display module 251. In addition, the processor 870 may output information related to the vehicle to different positions of the display module 251 according to types of information related to the vehicle.

The display module 251 may be a navigation system 770 (or a navigation device). In addition, the display module 251 may include a navigation system 770.

The vehicle control device 800 of the present disclosure may include a processor 870 capable of controlling the communication unit 810, the sensing unit 820, the output unit 830, and the like.

The processor 870 may perform a function related to autonomous driving using the sensing unit. In addition, the processor 870 may autonomously run the vehicle using the function related to autonomous driving.

The function related to autonomous driving may refer to a function included in an advanced driver assistance system (ADAS). For example, the function included in the ADAS may include various functions for autonomous driving, such as a driving speed setting function, a safety distance maintaining function, a lane maintaining/lane changing function, an anti-collision emergency stop function, and the like.

Various sensors of the sensing unit 820 may be used for the functions related to autonomous driving. For example, an image received through a camera may be used for the lane maintaining function, and a radar (or ultrasonic sensor) may be used for the safety distance maintaining function.

Figure 9:
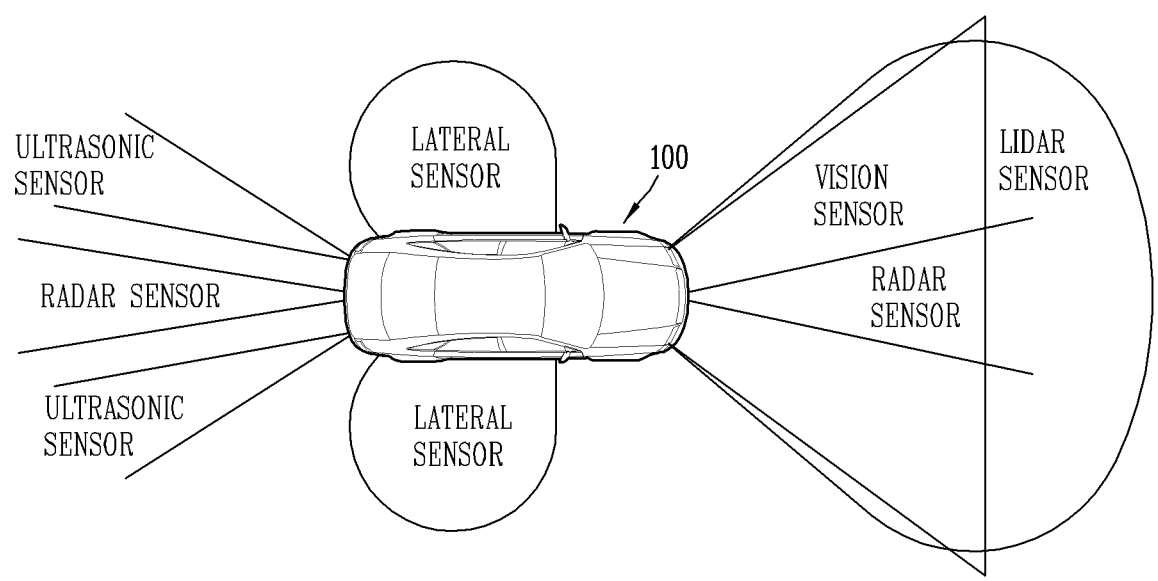
FIG. 9 is a conceptual view for explaining example sensors.

The at least one sensor included in the sensing unit 820 may have different characteristics depending on types of sensor. FIG. 9 is a conceptual view for explaining example sensors.

For example, in the case of a radar, it may be able to sense an object placed at a long distance from the vehicle (for example, long-range sensing is possible), and it accurately senses an object located in front of or behind the vehicle.

In addition, in the case of radar, it has characteristics that it is not greatly affected by weather, illumination, etc., and it is possible to sense an object at a cycle of 60 to 100 ms.

In some implementations, in the case of a vision sensor (for example, a camera), it is possible to sense an object placed at a shorter distance than the radar (for example, middle distance sensing is possible), and it may sense an object positioned on the side of the vehicle better than the radar.

In some implementations, the vision sensor is sensitive to weather and illuminance, and accuracy of sensing an object may be lower than that of the radar when it snows or rains, when it is foggy, or when an illumination intensity is low.

In some implementations, in the case of an ultrasonic sensor, it may sense an object placed at a distance shorter than the vision sensor (for example, short-range sensing may be possible).

In the case of the ultrasonic sensor, it may easily sense an object placed on the front/rear of the vehicle, but sensing an object placed on the side of the vehicle may be difficult.

In addition, in the case of the ultrasonic sensor, it may sense an object without being affected by intensity of illumination but it may be affected significantly by the weather (that is, it is sensitive) in sensing an object.

As described above, the plurality of sensors included in the sensing unit 820 may have different characteristics, and an optimized sensor may be used for each function related to autonomous driving.

In some implementations, in order to use the sensor of the sensing unit 820, software (for example, a program or an application) capable of driving the sensor (or interworking with the sensor) may be required. The software may be driven (or executed, controlled) by the processor 870 and installed (or stored) in an operating system (OS) controlled by the processor 870.

In some implementations, the software may require updating. For example, when security of the software is weakened or when the software is defective, the software may be updated to strengthen security or heal the defect.

A defect of the software or weakening of the software formed to drive the sensor may directly threaten safety of the user aboard the autonomous vehicle.

If a fault occurs in the software formed to drive the sensor, the sensor may not properly operate, and thus, a function related to autonomous driving may erroneously operate or may not operate, making autonomous driving impossible, and if the vehicle is already autonomously driven, it may lead to an accident.

If security of the software formed to drive the sensor is weakened, it may be exposed to the risk of hacking from the outside, and when the software is hacked, a sensor value may be rigged or the sensor may not be driven, making it impossible to autonomously drive the vehicle or causing the vehicle to be autonomously driven according to an operation of a hacker to threaten safety of the driver.

As such, updating of the software configured to drive the sensor may be a process to be essentially performed to heal software defects and security weaknesses.

In addition, the present disclosure may provide a method of instantly updating software when defects of the software are generated or security is weakened in a state in which the vehicle is autonomously driven.

For example, the processor 870 may receive, through the communication unit 810, an update request related to a first sensor used for a function related to autonomous driving, while the vehicle is in an autonomous driving state.

When the update request related to the first sensor is received through the communication unit, the processor 870 may perform updating related to the first sensor on the basis of whether a second sensor available in place of the first sensor is present.

Hereinafter, a method for safely maintaining autonomous driving although some sensors are not operated (or turned off) due to essential updating of the vehicle during autonomous driving will be described in more detail with reference to the accompanying drawings.

Figure 10:
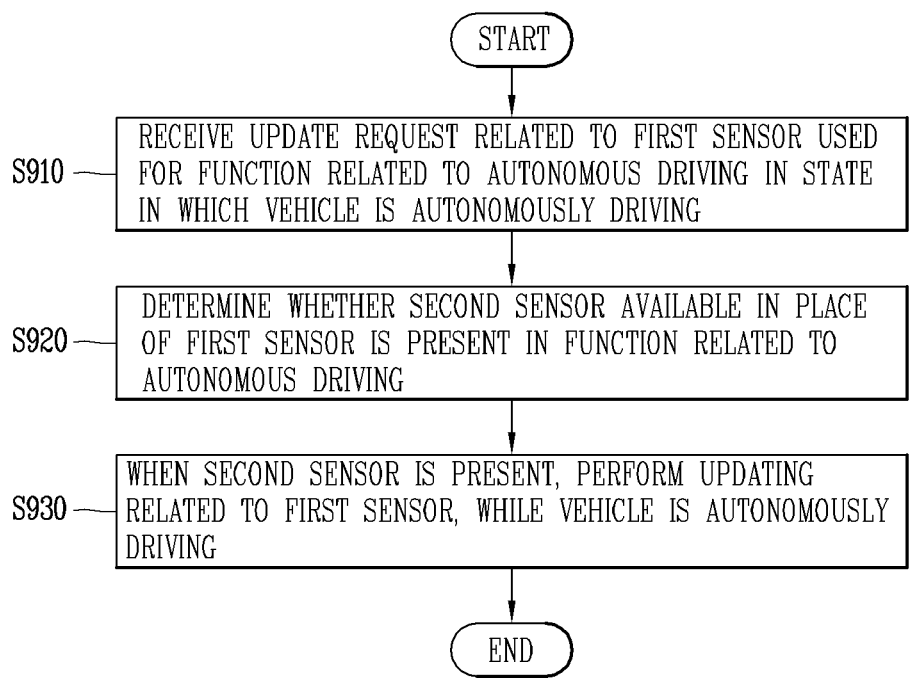
FIG. 10 is a flowchart for explaining an example control method.
Figure 11:
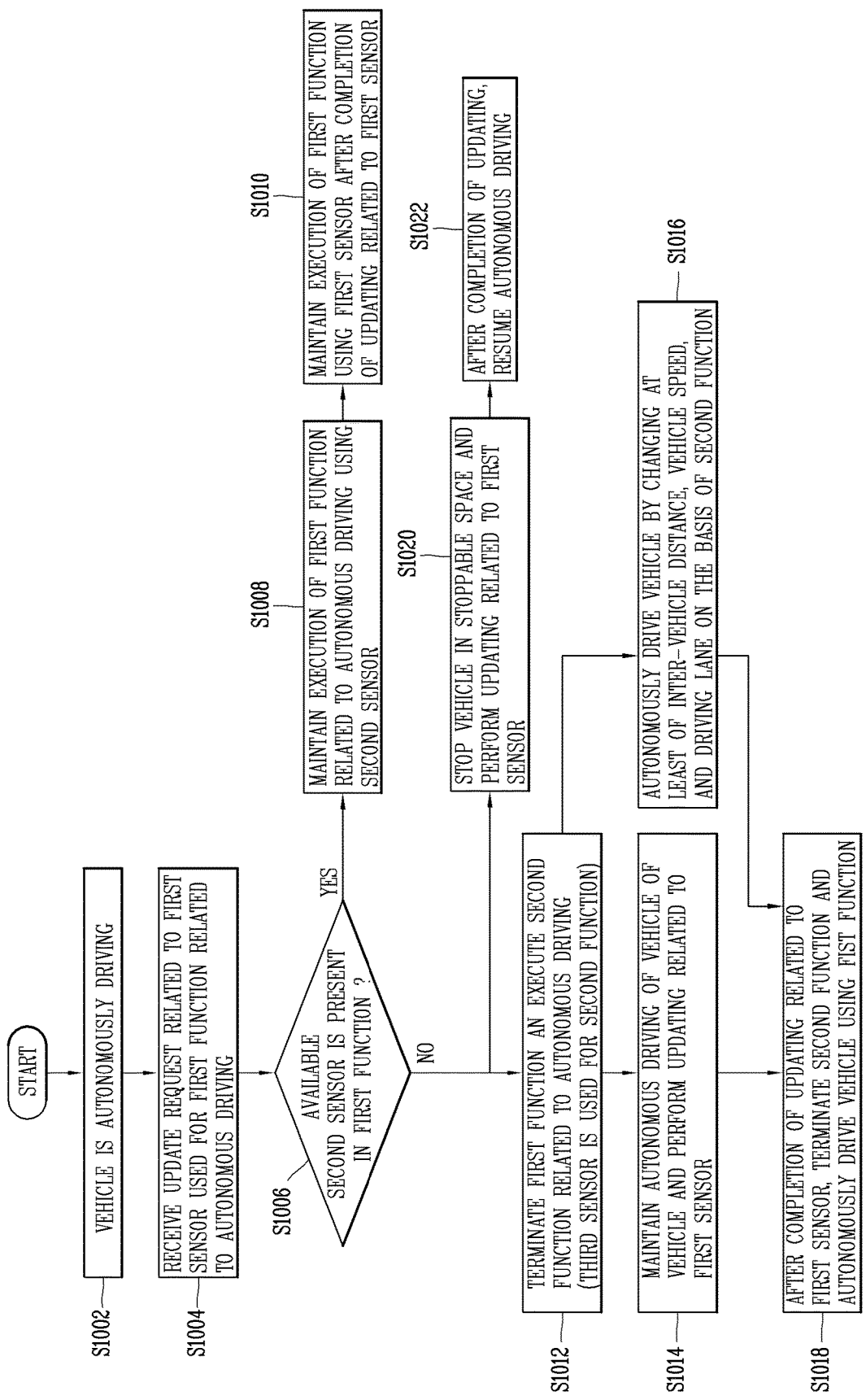
FIG. 11 is a flowchart illustrating an example method of performing updating related to an example sensor.

FIG. 10 is a flowchart for explaining an example control method of the present disclosure, and FIG. 11 is a flowchart for explaining an example method of performing updating related to a sensor.

First, referring to FIG. 10, in the present disclosure, an update request related to a first sensor used for a function related to autonomous driving is received in a state in which the vehicle autonomously driven (S910).

Specifically, the processor 870 may receive an update request related to a sensor used for a function (e.g., ADAS function) related to autonomous driving from an external device (e.g., an external server, a cloud server (or cloud), the Internet, a mobile terminal, etc.) through the communication unit 810.

The updating related to the sensor may include updating of software configured to drive a sensor used for the function related to autonomous driving, or updating of the sensor itself.

As described above, the functions related to the autonomous driving may include various functions executed for autonomously driving the vehicle. For example, the functions related to the autonomous driving may include an adaptive cruise control (ACC) function, a driving speed setting function, a safety distance maintaining function, lane maintaining/lane changing function, anti-collision emergency stop function, and the like.

The function related to autonomous driving may be performed based on information related to the vehicle sensed through the sensor included in the sensing unit 820.

When the update request related to the first sensor of the sensing unit 820 is received through the communication unit 810, the processor 870 may output information indicating the update request related to the first sensor, to the to the output unit 830

When a user approval is received through the output unit 830, the processor 870 may receive information (or data) used for updating from the external device requesting the updating, through the communication unit 810.

In some implementations, the processor 870 may receive information used for updating related to the first sensor, along with the update request related to the first sensor, without a separate user approval.

Thereafter, in the present disclosure, when the update request related to the first sensor is received, whether there is a second sensor available in place of the first sensor in the function related to autonomous driving (S920).

Specifically, the processor 870 may determine a function related to autonomous driving using the first sensor through the communication unit 810, when the update request related to the first sensor is received.

For example, when the first sensor is a camera, the processor 870 may determine a function related to autonomous driving using the camera.

For example, when the first sensor is a camera and the function related to autonomous driving using the first sensor (camera) is a safety distance maintaining function, the processor 870 may determine whether a second sensor available in place of the first sensor (camera) is present in the safety distance maintaining function.

In the function related to autonomous driving using the first sensor, a type of the second sensor which may be used in place of the first sensor may be different according to functions related to autonomous driving.

In the present disclosure, in case where there is a second sensor (for example, radar) available in place of the first sensor in the function related to autonomous driving using the first sensor, updating related to the first sensor is performed (S930).

When it is determined that the second sensor available in place of the first sensor is present in the function related to autonomous driving using the first sensor, the processor 870 may perform updating related to the first sensor.

Here, the determined second sensor may be used for the function related to autonomous driving which has been performed using the first sensor.

For example, in a state in which the function (safety distance maintaining function) related to autonomous driving is being executed using the first sensor (camera) (that is, in an autonomous driving state), when updating related to the first sensor (for example, updating of software formed to drive the first sensor) is requested and the second sensor (radar) which can replace the first sensor is present, then the processor 870 may perform the function (safety distance maintaining function) related to autonomous driving using the second sensor (radar) and may perform updating related to the first sensor while maintaining autonomous driving.

When updating related to the first sensor is performed, the first sensor may be impossible to use. That is, when updating related to the first sensor is performed, the first sensor may not operate or may be turned off.

Through this configuration, the present disclosure may provide a new vehicle control method capable of performing updating related to the first sensor while autonomously driving the vehicle using the second sensor which may replace the first sensor although an update request related to the first sensor is received.

In addition, the present disclosure may provide the vehicle control device and the vehicle control method capable of performing safe autonomous driving and strengthening security of the vehicle by immediately updating software related to the sensor used for autonomous driving, by performing updating related to the sensor during autonomous driving without stopping autonomous driving.

Various implementations of the present disclosure will be described with reference to FIG. 11.

First, the processor 870 may autonomously drive the vehicle 100 based on a user request (S1002). For example, when a destination is set by the user, the processor 870 may determine a route that may be performed from a current location of the vehicle to the destination and autonomously drive the vehicle 100 along the route.

The processor 870 may autonomously drive the vehicle using functions related to autonomous driving. The function related to the autonomous driving may refer to various functions included in the ADAS, for example.

During autonomous driving, the processor 870 may receive an update request related to the first sensor for autonomous driving related functions, via the communication unit 810 (S1004).

In this case, the processor 870 may receive information (or a file or data) used for an update related to the first sensor from an external device which has transmitted the update request, through the communication unit 810.

When the update request related to the first sensor used for the first function related to autonomous driving is received, the processor 870 determines whether a second sensor available in place of the first sensor is present in the first function related to autonomous driving (S1006).

That is, when the second sensor available in place of the first sensor is present, the processor 870 may perform updating related to the first sensor.

When updating related to the first sensor starts, the first sensor may be disabled or turned off. That is, during the updating related to the first sensor, the first sensor is unavailable.

In some cases, since the first function related to autonomous driving using the first sensor is not performed, autonomous driving of the vehicle should be also stopped.

In some implementations, in the first function, when the second sensor which may be used in place of the first sensor is present, execution of the first function may be maintained using the second sensor.

For example, if the second sensor available in the first function is present, the processor 870 may perform updating related to the first sensor and maintain the first function related to autonomous driving using the second sensor (or maintain execution of the first function) (S1008).

That is, when the second sensor to replace the first sensor is present, the processor 870 may maintain execution of the first function related to autonomous driving, which has been executed using the second sensor and perform updating related to the first sensor in the course of performing autonomous driving.

In a state in which updating related to the first sensor is being performed, the first sensor may not operate.

Thereafter, when updating related to the first sensor is completed, the processor may perform a function related to autonomous driving using the first sensor instead of the second sensor (S1010).

That is, when updating related to the first sensor is completed, the first sensor may be operated, so that the first function related to autonomous driving may be continuously performed using the first sensor, like that before using the second sensor.

In other words, when the second sensor which may be used in place of the first sensor used in the first function is present, the processor 870 may perform updating related to the first sensor during autonomous driving of the vehicle.

Through this configuration, the present disclosure may provide a vehicle control method capable of performing updating related to an update-requested sensor in a state in which autonomous driving is maintained using a sensor which may replace the sensor.

In some implementations, if the second sensor which may be used in place of the first sensor used for the first function in autonomous driving is not present, the processor 870 may control the vehicle in a predetermined manner For example, the processor 870 may terminate the first function related to autonomous driving using the first sensor and perform the second function related to autonomous driving (S1012).

Specifically, the processor 870 may execute the second function related to autonomous driving instead of the first function related to autonomous driving using the first sensor, and autonomously drive the vehicle using the second function. In addition, the processor 870 may perform updating related to the first sensor after terminating the first function (S1014).

Here, for the second function related to autonomous driving, a third sensor different from the first sensor may be used.

For example, it is assumed that the first function related to autonomous driving is a lane recognition driving function and the first sensor is a camera.

Here, if there is no sensor to perform the lane recognition driving function on behalf of the camera, the processor 870 may execute a preceding vehicle follow driving function (second function related to autonomous driving) different from the lane recognition driving function (first function related to autonomous driving).

The processor 870 may autonomously drive the vehicle using the preceding vehicle follow driving function (second function related to autonomous driving), and a radar (third sensor) different from the camera (first sensor) may be used for the preceding vehicle follow driving function.

Further, when the second function related to autonomous driving, instead of the first function related to autonomous driving, is executed, the processor 870 may autonomously drive the vehicle by changing at least one of an inter-vehicle distance, a vehicle speed, or a driving lane (i.e., a lane in which the vehicle is driving) (S1016).

For example, when the first function is the lane recognition driving function, the processor 870 may autonomously drive the vehicle at a first distance (for example, 50 m) as an inter-vehicle distance at a vehicle speed of 60 km/h in a first lane.

Here, as updating related to the first sensor is performed, the first function is terminated, and when the second function (e.g., the preceding vehicle follow driving function) related to autonomous driving using the third sensor is executed, the processor 870 may change the inter-vehicle distance to a second distance (e.g., 100 m) different from the first distance and change a vehicle speed to correspond to a speed of a preceding vehicle, and if the preceding vehicle is driving in a second lane, the processor 870 may change the driving lane from the first lane to the second lane.

That is, as the function related to autonomous driving is changed, the processor 870 may autonomously drive the vehicle by changing at least one of the inter-vehicle distance, the vehicle speed, or the driving lane.

Thereafter, when updating related to the first sensor is completed, the processor 870 may terminate the second function and autonomously drive the vehicle using the first function (S1018).

That is, when the first sensor becomes available again as updating related to the first sensor is completed, the processor 870 may terminate the second function using the third sensor in order to autonomously drive the vehicle in the autonomous driving manner before updating, and execute the first function using the first sensor again to autonomously drive the vehicle using the first function.

Through this configuration, the present disclosure may provide the new vehicle control method capable of performing updating related to the first sensor even in a state in which the vehicle is autonomously driven by executing the second function related to autonomous driving using the third sensor, although a case where the first function related to autonomous driving using the first sensor cannot be executed due to updating related to the first sensor occurs.

In some implementations, when the second sensor available in place of the first sensor used in the first function related to autonomous driving is not present, the processor 870 may sense a stoppable space (i.e., a space in which the vehicle may be stopped) using the sensing unit 820. Thereafter, the processor 870 may stop the vehicle in the stoppable space and perform updating related to the first sensor (S1020).

The stoppable space may be, for example, a space formed so as not to interfere with driving of the vehicle on the road, such as a resting place, a shoulder, a drowsy shelter, and a temporary stop space formed for stopping.

In case where the second sensor available in place of the first sensor is not present and the second function different from the first function for maintaining autonomous driving is not provided, the processor 870 may sense the stoppable space, stop the vehicle in the space, and perform updating related to the first sensor.

Thereafter, when updating related to the first sensor is completed, the processor 870 may autonomously drive the vehicle using the first function related to autonomous driving using the first sensor again (S1022).

Through this configuration, the present disclosure may provide the vehicle control method capable of driving the vehicle through autonomous driving after updating is completed in a stoppable space if updating needs to be performed urgently during autonomous driving.

In some implementations, in a state in which the vehicle is autonomously driving, the processor 870 may determine whether to perform updating related to the sensor in a state in which autonomous driving is maintained, on the basis of a driving environment of the vehicle which is autonomously driving, as well as a function related to the currently performed autonomous driving and the updated sensor characteristics.

Here, the driving environment of the vehicle may include a road, an object, weather, illumination, and the like.

For example, the road of the driving environment of the vehicle, may include whether or not a lane exists, curvature of the road, intersection, whether it is a ramp road, or the like.

In another example, the object of the running environment of the vehicle may include a preceding vehicle, a pedestrian, a traffic light, or the like.

Further, in another example, the weather of the driving environment of the vehicle may include whether it snows/rains, whether a visual distance secured due to the mist is less than a predetermined value, temperature/humidity, and the like.

In another example, the illuminance of the driving environment of the vehicle may include ambient brightness, whether a tunnel is present, and the like.

When an update request related to the first sensor used for the first function is received in a state in which the first function related to autonomous driving is executed, the processor 870 may determine whether the vehicle may be able to continuously drive on the basis of whether the second sensor available in place of the first sensor is present, whether the second function different from the first function is executable, and a driving environment of the vehicle.

For example, although the second sensor is not present and the second function is not executed, if it is determined that the vehicle is in a state of being continuously safely driven on the basis of a driving environment of the vehicle, the processor 870 may perform updating related to the first sensor, while autonomously driving the vehicle.

For example, the state in which the vehicle may be continuously safely driven may include a state in which the road is a straight road by a predetermined section or greater, a state in which there is no other vehicle in the vicinity and a driving route of the vehicle and location information of the vehicle can be obtained by a navigation system, and the like.

In some implementations, when an update request related to the first sensor is received, the processor 870 may sense a shape of the road in which the vehicle is driving through the sensing unit 820.

In addition, when the vehicle enters a section in which the shape of the road satisfies predetermined conditions, the processor 870 may perform updating related to the first sensor.

For example, the section in which the shape of the road satisfies the predetermined conditions may refer to a section in which the road is a straight road by a predetermined distance or greater (or in case where curvature is smaller than a predetermined value or in case where a radius of curvature is larger than a predetermined value).

For example, when an update request related to the first sensor is received in a state in which the vehicle is driving in the section not satisfying the predetermined conditions (for example, in a state in which the vehicle is driving in a section having curvature greater than a predetermined value), the processor 870 may not perform updating related to the first sensor although the second sensor available in place of the first sensor is present or although the second function different from the first function related to autonomous driving may be executed.

Thereafter, when the vehicle enters the section in which the shape of the road meets predetermined conditions, the processor 870 may perform updating related to the first sensor.

Here, as the vehicle enters the section in which the shape of the road satisfies the predetermined conditions, the processor 870 may perform autonomous driving in a state in which the first function is maintained using the second sensor or may autonomously drives the vehicle using the second function.

In addition, the processor 870 may determine a point in time at which updating related to the first sensor is to be performed by mixedly using a navigation or traffic system through the communication unit or in consideration of a change in illumination, the volume of traffic, and the like.

For example, when the vehicle enters at a time at which a change of illumination is small or when the vehicle enters a section with a small volume of traffic, the processor 870 may perform updating related to the first sensor.

In some implementations, the processor 870 may sense weather information through the sensing unit 820. Thereafter, the processor 870 may determine whether to perform updating related to the first sensor, while autonomously driving the vehicle based on the weather information.

For example, on the basis of the weather information, the processor 870 may determine the second sensor available in place of the first sensor in the first function related to autonomous driving. That is, since the characteristics of each sensor are different from each sensor, weather information may be taken into account when determining the second sensor available instead of the first sensor.

For example, in case where the first sensor is a radar which is less affected by the weather and in case where visibility is below a predetermined value due to snow, rain, or fog, a vision sensor or an ultrasonic sensor may not be used for first function.

In this case, the processor 870 may determine that the second sensor available in place of the first sensor is not present.

Further, the processor 870 may determine the second function to be executed instead of the first function related to autonomous driving on the basis of the weather information. For example, in a state in which the preceding vehicle follow driving function (first function) which is less affected by the weather is being executed, if visibility is below the predetermined value due to snow/rain or fog, the processor 870 may perform the lane recognition driving function (second function).

In this case, the processor 870 may determine that the second function to replace the first function used for autonomous driving is not present. Accordingly, the processor 870 may perform updating related to the first sensor after stopping the vehicle in a stoppable space.

If the weather information is suitable for using the second sensor or is suitable for using the second function, the processor 870 may perform updating related to the first sensor while the vehicle is autonomously driving using the second sensor or the second function.

In some implementations, the processor 870 may control the vehicle in various manners on the basis of an object of a surrounding environment of the vehicle.

For example, the processor 870 may sense an object within a predetermined distance from the vehicle through the sensing unit 820, while performing updating related to the first sensor.

Here, the object detected within the predetermined distance may be an obstacle obstructing autonomous driving of the vehicle such as a pedestrian or a bicycle which enters the road.

When an object is detected within a predetermined distance from the vehicle through the sensing unit, while updating related to the first sensor is being performed, the processor 870 may drive the vehicle by avoiding the object using a sensor other than the first sensor.

For example, in a situation in which the first sensor cannot be used as updating related to the first sensor (e.g., a radar) is performed, when an object within a predetermined distance from the vehicle is sensed through the second sensor (e.g., a camera), the processor 870 may autonomously drive the vehicle to avoid the object using the second sensor.

If another sensor (e.g., the second sensor) used for driving the vehicle by avoiding the object is not present, the processor 870 may stop the vehicle at a predetermined distance from the object until updating related to the first sensor is completed.

Thereafter, when updating related to the first sensor is completed or when the object is no longer sensed within the predetermined distance, the processor 870 may resume autonomous driving.

In some implementations where updating related to the first sensor is performed during autonomous driving, information regarding the updating related to the first sensor is being currently performed may be provided to a neighbor vehicle.

To this end, the processor 870 may turn on a lamp of the vehicle in a predetermined manner while updating related to the first sensor is performed.

For example, the processor 870 may control the lamp of the vehicle to be lighted such that an emergency light provided in the vehicle is turned on at every predetermined period, such that high beams are irradiated from a head lamp, or such that a brake light of a rear lamp is turned on although a brake device does not operate.

In addition, the processor 870 may irradiate notification information indicating that updating related to the first sensor is being performed to a road near the vehicle through the lamp of the vehicle, while updating related to the first sensor is being performed.

In addition, as discussed above, the processor 870 may perform follow autonomous driving to drive the vehicle to follow a preceding vehicle present ahead of the vehicle, while updating related to the first sensor is being performed.

Hereinafter, various implementations for performing updating related to the first sensor during autonomous driving will be described with reference to the accompanying drawings.

Figure 13:
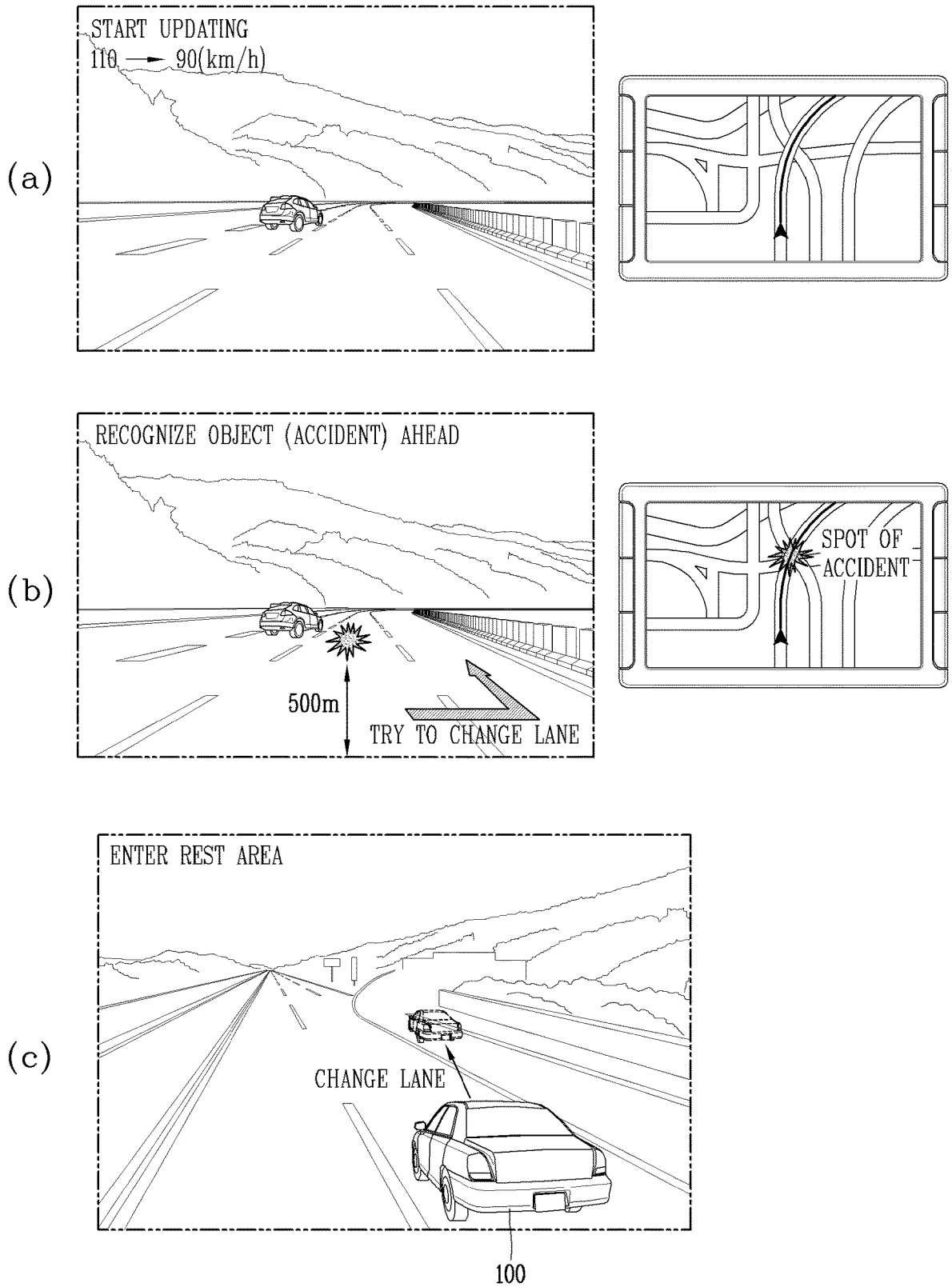

FIGS. 12, 13 and 14 are conceptual views for explaining various implementations of the present disclosure.

It is assumed that a sensor required to be updated is a camera in FIGS. 12 and 13.

A method for updating the first sensor while performing autonomous driving in a highway entry zone will be described with reference to (a) and (b) of FIG. 12.

When an update request related to the first sensor is received while the vehicle is in an autonomous driving state in the highway entry zone (for example, the ramp zone), the processor 870 may maintain a distance to a preceding vehicle by a predetermined distance (e.g., 200 m) or greater in order to ensure stability.

The processor 870 may calculate curvature of the curved lane using a GPS module of the communication unit (or navigation system) and start updating related to the first sensor on the basis of the curvature of the highway entry zone and location information of the vehicle received through the GPS module.

Here, the processor 870 may turn on the emergency light in order to inform a nearby vehicle that updating is being performed. Further, the processor 870 may perform the follow autonomous driving to drive to follow a preceding vehicle 1100 follows a preceding vehicle 1100 when nearby vehicles are more than a predetermined number.

As illustrated in (b) of FIG. 12, the processor 870 may sense a lane in which the vehicle 100 is driving in the highway entry zone and a lane of a highway to be entered on the basis of location information of the vehicle obtained through the communication unit 810 and map information previously stored in a memory (or obtained through the communication unit).

Here, as illustrated in (a) of FIG. 12, the processor 870 may maintain follow autonomous driving to follow the preceding vehicle 1100, while performing updating related to the first sensor.

Thereafter, when the vehicle 100 enters the highway, the processor may recognize that driver sets a speed of the vehicle. Here, the processor 870 may output speed limit information of the highway through the output unit 830.

Thereafter, while performing updating related to the first sensor, the processor 870 may maintain the distance to the preceding vehicle by the predetermined distance or longer although the vehicle enters the highway.

Further, the processor 870 may autonomously drive the vehicle on the highway at a speed lower than the speed set by the driver by a predetermined rate.

Here, in (a) and (b) of FIG. 12, the second sensor (radar) may be used instead of the first sensor (camera) which is updated.

Thereafter, when updating related to the first sensor is completed, the processor 870 may autonomously drive the vehicle on the highway using the first sensor.

In some implementations, as illustrated in (c) of FIG. 12, when a tunnel 1110 is detected in a forward direction through the sensing unit 820, the processor 870 may adjust a distance to the preceding vehicle to be larger (e.g., 300 m) than the predetermined distance. This is because an operation of the second sensor (e.g., radar) may be inaccurate in the tunnel.

Further, when the vehicle enters the tunnel, since the operation of the GPS module is inaccurate, the processor 870 may perform follow autonomous driving to follow the preceding vehicle.

If the preceding vehicle does not exist immediately before entering the tunnel, the processor 870 may stop the vehicle in a stoppable space existing near the tunnel before entering the tunnel, and then perform updating related to the first sensor.

Thereafter, when updating related to the first sensor is completed, the processor 870 may pass through the tunnel by autonomously driving the vehicle using the first function related to autonomous driving using the first sensor.

In some implementations, as illustrated in (a) of FIG. 13, when it is determined that a driving environment of the vehicle is in a continuously drivable state although updating related to the first sensor is performed, the processor 870 may perform updating related to the first sensor, while continuously autonomously driving the vehicle.

For example, in case where the vehicle enters a section where a shape of the road satisfies predetermined conditions (for example, the road is a straight road) and the volume of traffic on the road in which the vehicle is driving is less than a predetermined value (or if there is no other vehicle within a certain distance from the present vehicle), the controller may perform updating related to the first sensor while autonomously driving the vehicle without stopping.

Here, when updating related to the first sensor starts in a state in which the vehicle is driving at a first speed (e.g., 110 km/h), the processor 870 may autonomously drive the vehicle at a second speed (e.g., 90 km/h) lower than the first speed.

In addition, in order inform another vehicle to come that the present vehicle is performing updating, the processor 870 may turn on the lamp of the vehicle in a predetermined manner. In addition, when updating related to the first sensor starts, the processor 870 may change a driving speed of the vehicle to the second speed and switch the lane to a lane in which the vehicle may drive at the second speed.

Further, the processor 870 may control the vehicle to drive at the second speed in the changed lane using the GPS module and the map information.

In some implementations, as illustrated in (b) of FIG. 13, the processor 870 may sense an object 1200 (e.g., another vehicle, an accident vehicle, a pedestrian, etc.) ahead on the driving road, using the second sensor (e.g., radar) different from the first sensor being updated.

Thereafter, in order to drive by avoiding the object 1200, the processor 870 may determine whether the lane change is possible using the second sensor, and when it is determined that the lane change is possible, the processor 870 may autonomously drive the vehicle to avoid the object 1200.

Here, if it is difficult to operate the second sensor in a surrounding environment or if the lane change is impossible, the processor 870 may stop the vehicle at a predetermined distance from the object 1200 until updating related to the first sensor is completed. Here, the processor 870 may turn on the emergency light of the vehicle.

Thereafter, when updating related to the first sensor is completed, the processor 870 may resume autonomous driving by avoiding the object 1200 using the first function related to autonomous driving using the first sensor.

In some implementations, as illustrated in (c) of FIG. 13, when a stoppable space (for example, rest area) is sensed through the sensing unit 820, the processor 870 may stop the vehicle in the stoppable space. Thereafter, the processor 870 may perform updating related to the first sensor and, when updating is completed, the processor 870 may resume autonomous driving using the first sensor in the space.

FIG. 14 illustrates an example case where a sensor requiring updating is a radar.

As illustrated in (a) of FIG. 14, when an update request related to the first sensor (radar) is received during autonomous driving, the processor 870 may sense weather information using the sensing unit 820.

When it is determined that the weather information indicates that weather is dangerous for performing autonomous driving with the second function other than the first function related to autonomous driving using the first sensor, the processor 870 may sense a stoppable space through the sensing unit 820, stop the vehicle in the space, and perform updating related to the first sensor.

If it is determined that the weather information indicates a rainy state and autonomous driving is possible through the second sensor (for example, a camera), the processor 870 may lower a driving speed of the vehicle (for example, 90 km/h→60 km/h), and when a distance to a preceding vehicle is a predetermined distance (e.g., 200 m→300 m), the processor 870 may perform updating related to the first sensor, while maintaining autonomous driving.

Also, as illustrated in (b) of FIG. 14, when an update request related to the first sensor (radar) is received and a toll gate in front of the vehicle is sensed through the sensing unit 820, the processor 870 may lower a driving speed of the vehicle (e.g., 90 km/h→30 km/h) and determine whether to change the driving lane based on high-pass lane information shown in the navigation system.

Thereafter, the processor 870 may initiate updating related to the first sensor as the vehicle is located in the lane for passing through the tollgate.

In addition, after passing through the tollgate, the processor 870 may change the lowered driving speed to the original speed (e.g., 30 km/h→90 km/h).

In some implementations, as illustrated in (c) of FIG. 14, if an object 1300 (e.g., a person) appears in front of the vehicle while performing updating related to the first sensor (radar), the processor 870 may detect the object using the second sensor (for example, a camera or an ultrasonic sensor) different from the first sensor.

Thereafter, the processor 870 may stop the vehicle at a predetermined distance from the object by operating an anti-collision emergency stop function (e.g., an autonomous emergency braking (AEB)) which urgently stops the vehicle using the second sensor.

Here, updating related to the first sensor may continue.

Thereafter, the vehicle may wait in a stopped state for a predetermined time, and if the object is not sensed within a predetermined distance from the vehicle, the processor 870 may resume autonomous driving.

If the object is detected within the predetermined distance from the vehicle after the predetermined time has lapsed, the processor 870 may restart autonomous driving by avoiding the object using the second sensor different from the first sensor.

In some implementations, if it is impossible to drive by avoiding the object (for example, the second sensor available in place of the first sensor is not present or if there is no function for driving the vehicle by avoiding the object (or the function inexecutable), the processor 870 may stop the vehicle until updating related to the first sensor is completed.

Thereafter, when updating related to the first sensor is completed, the processor 870 may perform autonomous driving by avoiding the object using the function related to autonomous driving using the first sensor.

In some implementations, whether to perform updating related to the sensor while performing autonomous driving may be determined on the basis of types of updating.

The types of updating related to a sensor may be classified as general updating and urgent updating.

The general updating is updating that does not significantly affect an operation of the sensor, and the sensor may properly perform an operation without performing the general updating.

The emergency updating may be updating performed when a fatal defect that may cause the sensor to malfunction occurs or security weakening occurs.

When a general updating request is received while the vehicle is autonomously driving, the processor 870 may output only notification information indicating that there is an update request through the output unit 830, and if there is a user approval, the processor 870 may stop the vehicle and perform updating.

In some implementations, when the emergency updating request is received in a state in which the vehicle is autonomously driving, the processor 870 may perform emergency updating in a state in which the autonomous driving of the vehicle is maintained (that is, in a state in which autonomous driving is maintained using the second sensor available in place of the first sensor or using the second function different from the first function), or stop the vehicle in a stoppable space and immediately perform emergency updating in the manner as described above in this disclosure.

In addition, when emergency updating is requested, the processor 870 may output through the output unit 830 information related to the second function available in place of the first function which is inexecutable by the updated sensor.

Thereafter, when any one second function is selected through the output unit 830, the processor 870 may execute the second function and may perform updating related to the sensor while maintaining autonomous driving.

According to the implementations of the present disclosure, one or more of the following effects may be obtained as follows.

First, the present disclosure may provide a new vehicle control method capable of performing updating related to a sensor, while autonomously driving a vehicle.

Second, the present disclosure may provide a vehicle control device and a vehicle control method capable of safely performing updating related to a sensor while driving the vehicle.

Third, the present disclosure may provide a new vehicle control method capable of maintaining autonomous driving although updating related to a sensor is started.

The effects of the present disclosure are not limited to the effects mentioned above, and other effects not mentioned may be clearly understood by those skilled in the art from the description of the claims.

The vehicle control device 800 described above may be included in the vehicle 100.

The operation or control method of the vehicle control device 800 described above may be inferred and applied to the operation or the control method of the vehicle 100 (or the controller 170) in the same or similar manner.

For example, the vehicle control method may include receiving an update request related to a first sensor used for a function related to autonomous driving in a state in which the vehicle is autonomously driving, determining whether a second sensor available in place of the first sensor is present in the function related to autonomous driving, and performing updating related to the first sensor while autonomously driving the vehicle, if the second sensor is present.

Here, in the performing step, if the second sensor available in place of the first sensor, updating related to the first sensor may be performed and the function related to autonomous driving may be maintained using the second sensor.

In addition, in the performing step, the function related to autonomous driving may be performed using the first sensor instead of the second sensor when updating related to the first sensor is completed.

A more specific implementation may be replaced with the above-described contents, or may be inferred or applied in the same or similar manner.

Each of the above steps may be performed by the controller 170 provided in the vehicle 100, as well as the vehicle control device 800.

Further, all the functions, configurations, or control methods performed by the vehicle control device 800 described above may be performed by the controller 170 provided in the vehicle 100. That is, all the control methods described in this disclosure may be applied to a control method of a vehicle or a control method of a control device.

Further, the vehicle control device 800 illustrated above may be a mobile terminal. In this case, all functions, configurations, or control methods performed by the vehicle control device 800 may be performed by the controller of the mobile terminal. In addition, all the control methods described in this disclosure may be inferred or applied to the control method of the mobile terminal in the same or similar manner.

Specifically, the mobile terminal may be formed as a wearable device (e.g., watch, glass, etc.) as well as a smartphone.

Further, the mobile terminal may be connected to perform communication with the vehicle control device through the communication unit.

The mobile terminal may transmit and receive all kinds of screen information, signals related to vehicle control, and user input signals described in the present disclosure through the communication unit.

In addition, the mobile terminal may receive all kinds of screen information described in the present disclosure through the communication unit and output it to the display unit of the mobile terminal. Further, when a touch (or selection) is performed through the display unit of the mobile terminal, the touched (selected) information may be transmitted to the vehicle control device. The vehicle may be controlled based on the touched information.

Further, when a gear of the vehicle is changed or a running state of the vehicle is changed, the vehicle control device may transmit information related to the gear change of the vehicle or the running state of the vehicle to the mobile terminal through the communication unit. In this case, screen information related to parking that is output to the mobile terminal may be changed by applying the contents described in this disclosure.

The present disclosure described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the controller 180 of the terminal. Thus, the foregoing detailed description should not be interpreted limitedly in every aspect and should be considered to be illustrative. The scope of the present disclosure should be determined by reasonable interpretations of the attached claims and every modification within the equivalent range are included in the scope of the present disclosure.

The foregoing implementations and advantages are merely exemplary and are not to be considered as limiting the present disclosure. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary implementations described herein may be combined in various ways to obtain additional and/or alternative exemplary implementations.

As the present features may be embodied in several forms without departing from the characteristics thereof, it should also be understood that the above-described implementations are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A vehicle control device for a vehicle that includes a communication unit and a sensing unit including at least one sensor, the vehicle control device comprising:
    at least one processor; and
    at least one computer-readable memory that is operably connectable to the at least one processor and that has stored thereon instructions which, when executed, cause the at least one processor to perform operations comprising:
    performing a function related to autonomous driving based on a sensor signal from the sensing unit;
    autonomously driving the vehicle based on performance of the function related to autonomous driving;
    in a state in which the vehicle is autonomously driven, receiving an update request related to a first sensor of the sensing unit from the communication unit of the vehicle;
    determining presence of a second sensor configured to provide the sensor signal for performance of the function related to autonomous driving; and
    in response to reception of the update request, updating information related to the first sensor based on presence of the second sensor,
    wherein the vehicle control device is configured to connect to the communication unit of the vehicle and to the sensing unit of the vehicle.

2. The vehicle control device of claim 1, wherein the operations further comprise:
    based on a determination that the second sensor is present at the vehicle, updating the information related to the first sensor; and
    maintaining performance of the function related to autonomous driving based on a second sensor signal from the second sensor.

3. The vehicle control device of claim 2, wherein the operations further comprise:
    based on completion of updating the information related to the first sensor, performing the function related to autonomous driving based on a first sensor signal from the first sensor.

4. The vehicle control device of claim 1, wherein updating the information comprises updating the information related to the first sensor in a state in which the vehicle is autonomously driven.

5. The vehicle control device of claim 1, wherein the operations further comprise:
    based on a determination that the second sensor is not present at the vehicle, controlling the vehicle in a predetermined manner.

6. The vehicle control device of claim 5, wherein the operations further comprise:
    terminating a first function related to autonomous driving based on a first sensor signal from the first sensor;
    performing a second function related to autonomous driving;
    autonomously driving the vehicle based on performance of the second function related to autonomous driving; and
    updating the information related to the first sensor after termination of the first function.

7. The vehicle control device of claim 6, wherein performing the second function comprises performing the second function related to autonomous driving based on a third sensor signal from a third sensor, the third sensor being different from the first sensor.

8. The vehicle control device of claim 6, wherein the operations further comprise:
    based on completion of updating the information related to the first sensor, terminating the second function; and
    based on termination of the second function, autonomously driving the vehicle based on performance of the first function.

9. The vehicle control device of claim 6, wherein the operations further comprise:
    based on execution of the second function, autonomously driving the vehicle by changing at least one of an inter-vehicle distance, a vehicle speed of the vehicle, or a lane in which the vehicle is currently driving.

10. The vehicle control device of claim 5, wherein the operations further comprise:
    determining an available space based on the sensor signal from the sensing unit;
    stopping the vehicle at the available space; and after stopping the vehicle at the available space, updating the information related to the first sensor.

11. The vehicle control device of claim 1, wherein the operations further comprise:

determining a shape of a road in which the vehicle is currently driving based on the sensor signal from the sensing unit;

determining whether the vehicle enters one or more sections of a road having a shape that satisfies a predetermined condition, wherein the one or more sections of a road having the shape that satisfies the predetermined condition comprises a section of the road where a radius of curvature is larger than a predetermined value; and based on a determination that the vehicle enters at least a section of the road having the shape that satisfies the predetermined condition, updating the information related to the first sensor.

12. The vehicle control device of claim 1, wherein the operations further comprise:

receiving weather information from the sensing unit; and based on the weather information, determining whether to update the information related to the first sensor in a state in which the vehicle is autonomously driven.

13. The vehicle control device of claim 1, wherein the operations further comprise:

while updating the information related to the first sensor, detecting, through the sensing unit, that an object is located at a predetermined distance from the vehicle; and based on detection of the object located at the predetermined distance, driving the vehicle to avoid the object based on a signal from a sensor that is different from the first sensor.

14. The vehicle control device of claim 13, wherein the operations further comprise:

determining whether the sensor different from the first sensor is available to provide the signal for driving the vehicle to avoid the object; and based on a determination that the sensor different from the first sensor is not available, stopping the vehicle at a location outside of the predetermined distance until completion of updating the information related to the first sensor.

15. The vehicle control device of claim 1, wherein the operations further comprise:

turning on a lamp of the vehicle in a predetermined manner while updating the information related to the first sensor.

16. The vehicle control device of claim 1, wherein the operations further comprise:

autonomously driving the vehicle based on a preceding vehicle present ahead of the vehicle while updating the information related to the first sensor.

17. A vehicle comprising:

one or more wheels;

a power source configured to drive the one or more wheels;

a vehicle control device configured to control operation of the vehicle;

a communication unit configured to communicate with the vehicle control device; and a sensing unit configured to provide a sensor signal to the vehicle control device, the sensing unit comprising at least one sensor;

wherein the vehicle control device comprises:

at least one processor; and at least one computer-readable memory that is operably connectable to the at least one processor and that has stored thereon instructions which, when executed, cause the at least one processor to perform operations comprising:

performing a function related to autonomous driving based on the sensor signal from the sensing unit;

autonomously driving the vehicle based on performance of the function related to autonomous driving;

in a state in which the vehicle is autonomously driven, receiving an update request related to a first sensor of the sensing unit from the communication unit;

determining presence of a second sensor that is configured to provide the sensor signal for performance of the function related to autonomous driving; and in response to reception of the update request, updating information related to the first sensor based on presence of the second sensor.

18. A method for controlling a vehicle, the method comprising:

performing a function related to autonomous driving based on a sensor signal from a sensing unit of the vehicle;

autonomously driving the vehicle based on performance of the function related to autonomous driving;

in a state in which the vehicle is autonomously driven, receiving an update request related to a first sensor of the sensing unit;

determining presence of a second sensor that is configured to provide the sensor signal for performance of the function related to autonomous driving; and in response to reception of the update request, updating information related to the first sensor based on presence of the second sensor in a state in which the vehicle is autonomously driven.

19. The method of claim 18, wherein updating the information comprises:

based on a determination that the second sensor is present at the vehicle, updating the information related to the first sensor; and maintaining performance of the function related to autonomous driving based on a second sensor signal from the second sensor.

20. The method of claim 19, wherein updating the information further comprises:

based on completion of updating the information related to the first sensor, performing the function related to autonomous driving based on a first sensor signal from the first sensor.

* * * * *